United States Patent
Shrivastava et al.

(10) Patent No.: US 11,614,951 B2
(45) Date of Patent: Mar. 28, 2023

(54) SYSTEM FOR CUSTOM VALIDATIONS AND SCRIPTS FOR MOBILE APPLICATIONS

(71) Applicant: ORACLE INTERNATIONAL CORPORATION, Redwood Shores, CA (US)

(72) Inventors: Saurabh Shrivastava, Fremont, CA (US); Srikanth Doddadalivatta Venkatesh Prasad, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 16/812,565

(22) Filed: Mar. 9, 2020

(65) Prior Publication Data
US 2021/0279079 A1 Sep. 9, 2021

(51) Int. Cl.
*G06F 9/445* (2018.01)

(52) U.S. Cl.
CPC ...... *G06F 9/44526* (2013.01); *G06F 9/44505* (2013.01)

(58) Field of Classification Search
CPC .......................... G06F 9/44526; G06F 9/44505
See application file for complete search history.

(56) References Cited

U.S. PATENT DOCUMENTS

| | | | |
|---|---|---|---|
| 9,083,765 B2 | 7/2015 | Rehman et al. | |
| 2005/0160104 A1* | 7/2005 | Meera | G06F 8/36 |
| 2007/0078950 A1 | 4/2007 | Hopkins et al. | |
| 2008/0271059 A1* | 10/2008 | Ott | G06F 9/54 |
| | | | 719/328 |
| 2013/0205189 A1 | 8/2013 | DiPierro et al. | |
| 2016/0171024 A1* | 6/2016 | Van Rotterdam | G06F 16/235 |
| | | | 707/695 |
| 2018/0165068 A1 | 6/2018 | Kumar | |
| 2019/0124081 A1* | 4/2019 | Nowak | H04L 63/101 |

(Continued)

OTHER PUBLICATIONS

Alayacare, Alayacare Mobile App Offline Mode, pp. 1-13; downloaded on Mar. 9, 2020 at: https://alayacare.zendesk.com/nc/en-us/articles/236368468-How-do-I-use-the-mobile-app-when-I-am-offline-Offline-Mode-.

(Continued)

*Primary Examiner* — S. Sough
*Assistant Examiner* — Carina Yun
(74) *Attorney, Agent, or Firm* — Kraguljac Law Group, LLC

(57) ABSTRACT

Systems, methods, and other embodiments associated with enabling client-side enforcement of custom rules when the client is in offline mode include: creating a custom rule for enforcement on a mobile application client on a mobile application server; defining characteristics of user accounts for which the mobile application client is to enforce the custom rule; in response to a connection being established between an instance of the mobile application client for a specific user account and the mobile application server, determining that the instance of the mobile application client should enforce the custom rule based at least in part on a match between characteristics of the specific user account and the defined characteristics; and transmitting the custom rule to the instance of the mobile application client to enable the instance to enforce the custom rule when the instance is operating in the offline mode.

20 Claims, 15 Drawing Sheets

(56) References Cited

U.S. PATENT DOCUMENTS

2020/0052976 A1    2/2020   Sherman et al.
2020/0092374 A1*   3/2020   Mehta ................. H04L 41/0869

OTHER PUBLICATIONS

Oracle, Oracle Code Editor, pp. 1-3, copyright 2003, 2018; downloaded on Mar. 5, 2020 at: https://docs.oracle.com/database/apex-18.1/HTMDB/code-editor.htm.

Jean-Sebastien Delfino, Sebastien's Blog, Caching Javascript in a Mobile Web App;, pp. 1-2, Oct. 14, 2011; downloaded on Mar. 9, 2020 from: https://jsdelfino.blogspot.com/2011/10/caching-javascript-in-mobile-web-app.html.

Microsoft, Work offline with Dynamics 365 for phones and tablets / Microsoft Docs; pp. 1-13; Jan. 8, 2020; downloaded from: https://docs.microsoft.com/en-us/dynamics365/mobile-app/v8/go-mobile/work-offline.

Patent Cooperation Treaty (PCT) International Search Report and Written Opinion issued in PCT International Application No. PCT/US2021/014607 (International Filing Date Jan. 22, 2021 (Jan. 22, 2021), dated May 11, 2021 (dated May 11, 2021) 13 pgs.

* cited by examiner

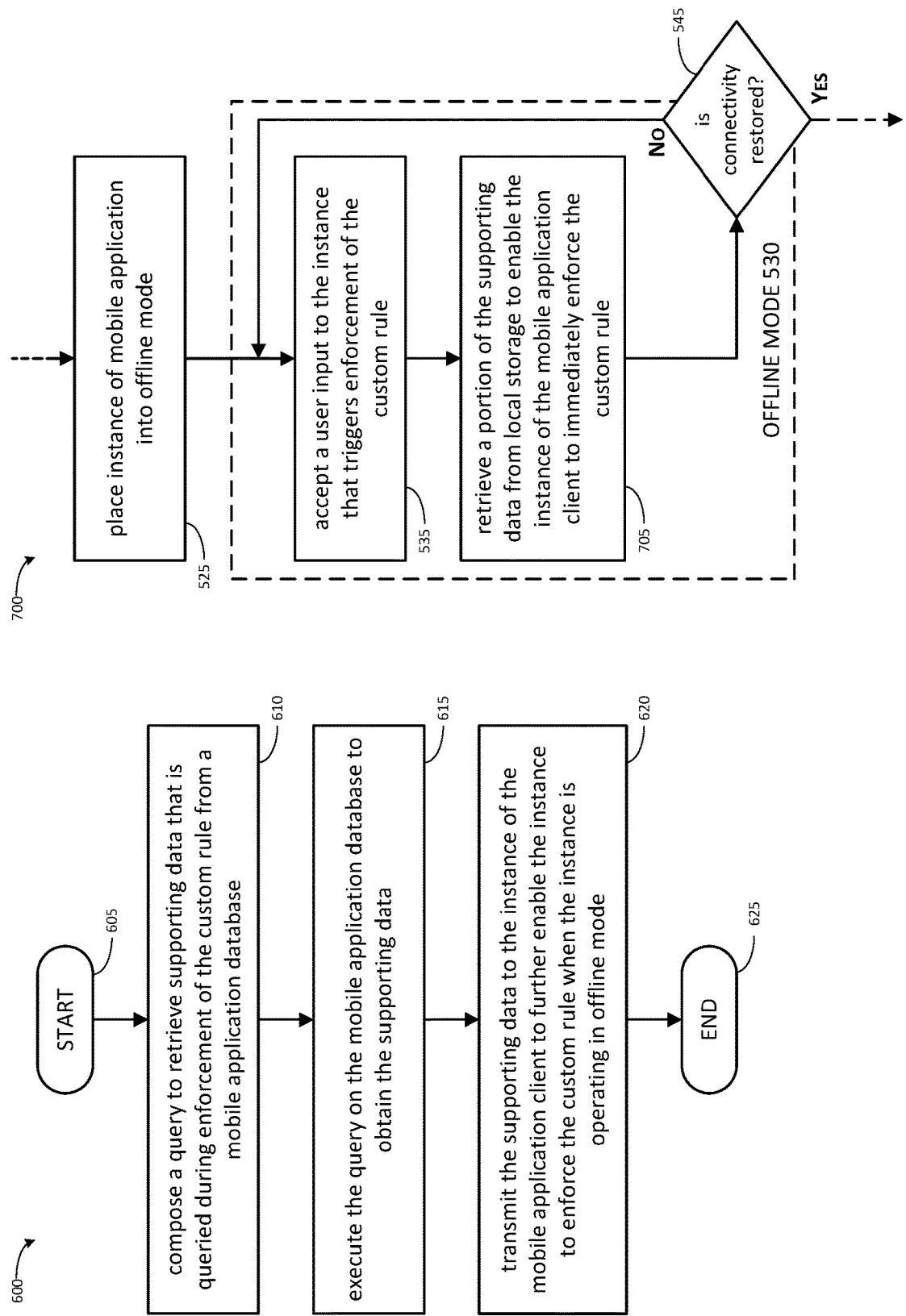

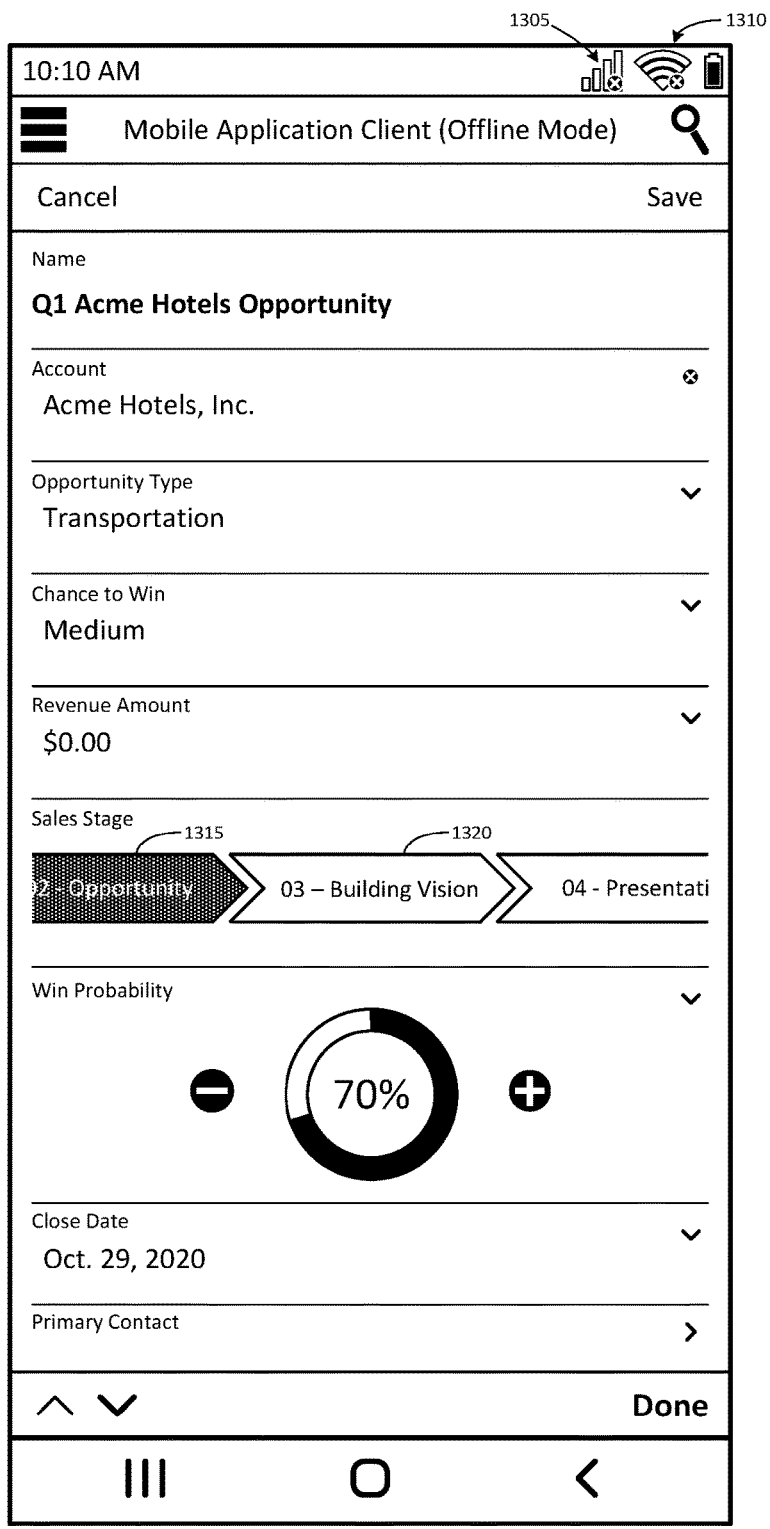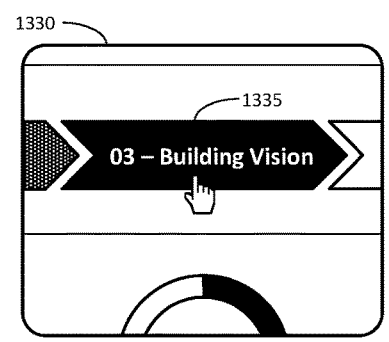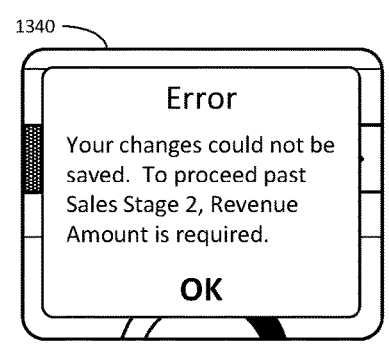
FIG. 13

SYSTEM FOR CUSTOM VALIDATIONS AND SCRIPTS FOR MOBILE APPLICATIONS

BACKGROUND

Business users increasingly are using mobile applications to perform day-to-day work functions. For example, sales reps performing store visits may take orders or record other information using their mobile devices, and technicians may perform service wrap-up tasks using their mobile devices. Vendors of mobile application solutions may provide a solution that the customer wishes to add customized functionality to. But customization of mobile application functionality suffers from a number of limitations that limit the utility of such customizations. For example, changes to customization may require a new build of mobile application client software. Also customized functions may not work when mobile client software is operating in offline mode.

What is needed is a technique to overcome these and other limitations on the utility of customizations to mobile applications.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

FIG. 6 illustrates one embodiment of a method associated with implementing custom validation and business logic (custom rule) scripting with supporting data in 'offline mode' operation of a mobile application client.

FIG. 7 illustrates a portion of a method including an additional parallel method step associated with providing supporting data for custom rules during offline operation.

FIG. 13 illustrates an example client GUI for a mobile application client instance associated with implementing custom validation and business logic (custom rule) scripting during offline-mode operations.

DETAILED DESCRIPTION

Figure 1:
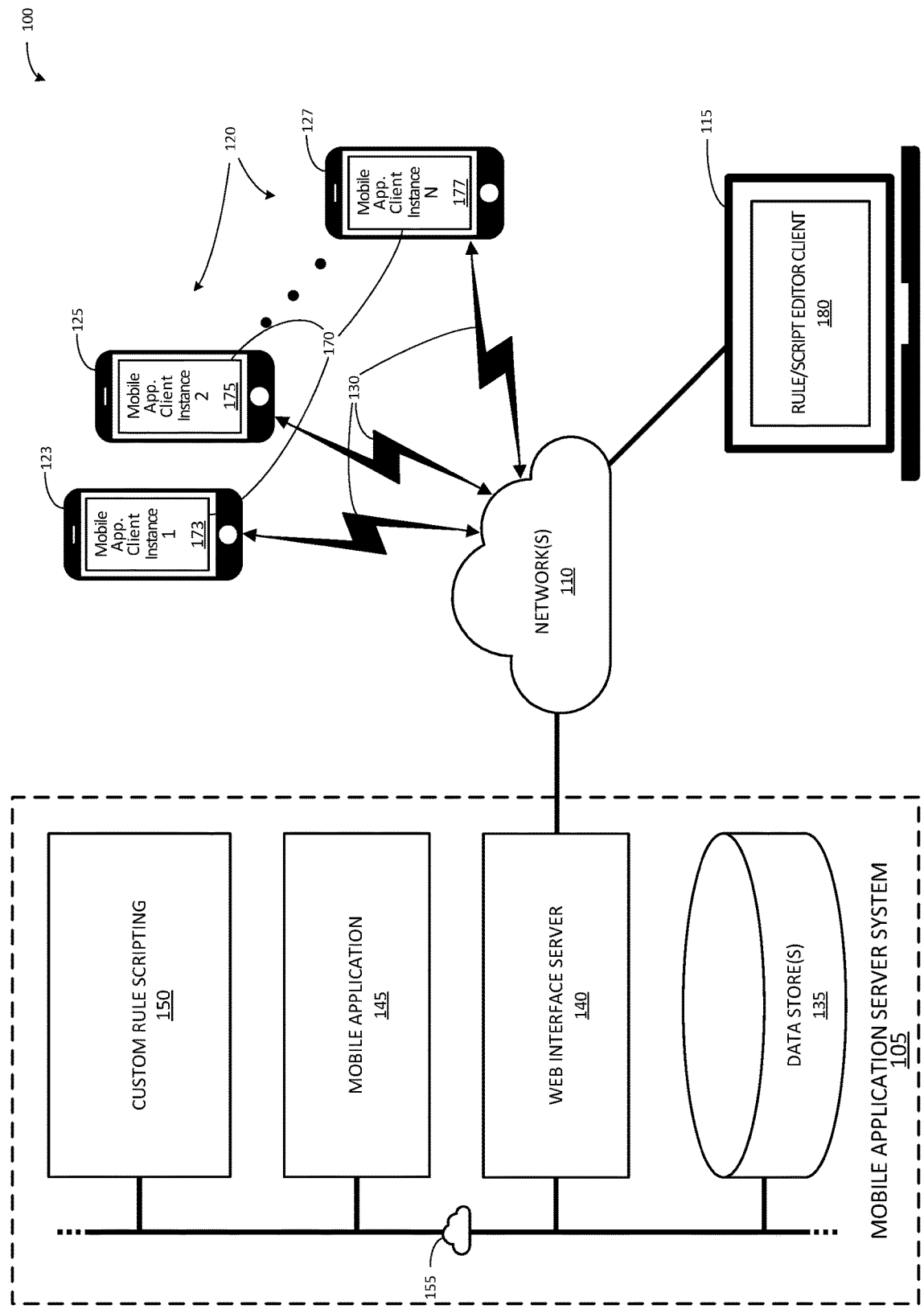
FIG. 1 illustrates one embodiment of an environment associated with implementing custom validation and business logic (custom rule) scripting for mobile application offline-mode operation.

Systems and methods are described herein for custom validations and scripts for mobile applications that can be run in the mobile application regardless of whether the mobile application is being run in online or offline mode. Mobile application systems such as Oracle® CX Mobile Applications platform may provide features including, but not limited to, representational state transfer (REST) data control, offline read and/or write, extensibility, login and security, application updates, application user interface and/or user experience patterns on top of the Oracle® mobile application framework (MAF) platform to both horizontal mobile applications ("general purpose" applications designed to be used by many different types of users and businesses) and vertical mobile applications ("purpose built" applications constructed to provide specific functions and processes unique to a specific user or business).

Business entities may implement a mobile application in order to enhance business productivity. Mobile applications directed to a variety of business purposes, such as Customer Relationship Management (CRM), are offered by a number of vendors, and may include standard features that enable or enhance common tasks in support of that purpose, such as sales tools, communication tools, and customer care tools. But, business entities may wish to extend or modify the mobile application to address business situations specific to their organization, personnel, regions, customers, or other aspects of their business. Accordingly, some mobile applications can be customized to include custom business logic and/or validations specific to the particular needs of the business enterprise implementing the mobile application. The custom business logic and custom validations may be referred to herein collectively as "custom rules." Mobile applications such as those implemented on the Oracle® CX platform may be customized to a certain extent by, for example, adding new standard and/or custom objects, customizing page layouts, configuring saved searches, and managing application settings, but these operations alone do not enable the capability to run custom rules locally on a mobile device, especially when it is disconnected from the network.

In one particular example, field level triggers to enforce custom validation rules do not work over representational state transfer (REST) transactions. As a result, transactions from a mobile application may not enforce the required validations, leading to downstream impact with incorrect data.

Often, the business users are working in areas where there is no or poor network connectivity, during which the mobile device will continue to operate in an "offline mode." Under such situations, it is extremely important that users be able to continue to work with their mobile app and still have all the custom business logic and validations operate and be enforced. But, where the custom business logic and the custom validations are implemented on the server side of the mobile application, loss of network connectivity cuts off the mobile client's access to these custom rules, and may also cut off access to data needed to properly execute the custom rules. In the offline mode, such mobile applications with server side implementation of custom rules can delay the custom validations or business logic until network connectivity is restored. This allows the user to perform the transaction with those minimal validations that are native to (that is, included in) the mobile application client, but the custom validations and custom business logic are not applied or enforced until the time when the data is synced from mobile application to the server.

For example, a sales representative may use a mobile application with the mobile application operating in offline mode for the entire day. As the sales representative goes about their store visits, they are selling various promotions and/or entering orders. The sales representative then returns to a distribution center, where the mobile application will synchronize through the local network. Only then will custom business logic and/or validations be enforced. But, where the transactions being performed in offline mode have a contractual binding effect (such as taking an order at a store), it is important that all validations be enforced at the time of performing such transactions. In another example, where the transactions being performed in offline mode include promotional discounts (implemented by custom business logic), the discounts should be reflected in the order totals. By the time the sales representative returns to the distribution center, it is too late to perform the enforcement of the custom business logic or custom validations.

To overcome these and other challenges, the systems and methods disclosed herein enable creation of custom business logic and custom validations that can be enforced immediately on the mobile client at the time a transaction is performed, regardless of the state of network connectivity between the mobile client and the server. In particular, the systems and methods described herein present (1) a simple way for business entities to write custom business logic or validations and deploy the custom logic or validations with their mobile application is presented; and (2) a way to ensure that these custom validations and business logic work regardless of the state of network connectivity during use of the application.

The systems and methods described herein enable business users to use the mobile application in offline or online mode with the same set of business logic and validations enforced regardless of their network connectivity. This allows the user to use the mobile application in the most effective way. The systems and methods described herein also enable data validation at the time of transaction performance, which ensures the data meets any or all contractual requirements regardless of the state of network connectivity. The systems and methods described herein enhance data validation in the mobile application. Validated data also ensures good quality data entered in the system which ensures better results with business intelligence and artificial intelligence systems which feed off of the entered data. The systems and methods described herein also enable having custom business logic working in the mobile app regardless of network connectivity. This allows mobile users to perform all aspects of their work from the mobile device. The systems and methods described herein also enable instant validation instead of validation that occurs later in an asynchronous mode. Instant validation provides users with greatly improved user experience and usability of the mobile application.

—Example Environment for Custom Rules for Mobile Apps—

FIG. 1 illustrates one embodiment of an environment 100 associated with implementing custom validation and business logic (custom rule) scripting for mobile application offline-mode operation. In one embodiment, a mobile application server system 105 is connected by a network 110 to one or more client computing devices 115 and one or more mobile devices 120 (including first mobile device 123, second mobile device 125, and Nth mobile device 127). There may be many mobile devices 120 connected to mobile application server system 105. In one embodiment, the number N of mobile devices 120 operating in the environment 100 may approximate the number of authorized users of the mobile application server system 105, as most users of the mobile application will have a dedicated mobile device 120. Each mobile device 120 is connected to the network by a wireless network connection 130, such as a wi-fi or cellular data network. In one embodiment, mobile application server system 105 includes one or more data stores 135, a web interface server module 140, mobile application module 145, and custom rule scripting module 150, interconnected, in one embodiment, by a back-end network 155. In one embodiment, each of the mobile devices 120 are configured with an instance of a mobile application client 170: first mobile device 123 is configured with mobile application client instance 1 173, second mobile device 125 is configured with mobile application client instance 2 175, and Nth mobile device 127 is configured with mobile application client instance N 177). In practice, there may be a practically unlimited number of client instances, limited only by the ability of server side hardware to support the demands of the clients. In one embodiment, client computing device 115 is configured with an administration client instance 180.

In one embodiment, any or all of these components 135-165 may be implemented by one or more different hardware systems and components, even though represented as discrete components of mobile application server system 105. For example, the mobile application server system 105 may be hosted on a distributed computing system made up of at least one, but likely multiple, "servers." A server is a physical computer dedicated to providing data storage and an execution environment for one or more software applications or services intended to serve the needs of the users of other computers that are in data communication with the server, for instance via a public network such as the Internet or a private "intranet" network. The server, and the services it provides, may be referred to as the "host" and the remote computers, and the software applications running on the remote computers, being served may be referred to as "clients." Depending on the computing service(s) that a server offers it could be referred to as an application server, database server, data storage server, file server, mail server, print server, web server, or other service-descriptive name.

In one embodiment, mobile application server system 105 may be implemented using cloud-based infrastructure components to provide the functions described for the components of the mobile application server system 105 (or other functions disclosed herein). In one example configuration, mobile application server system 105 is operated by a third party for the benefit of multiple account owners/tenants, in a multi-tenant architecture. In one embodiment, mobile application server system 105 is part of a cloud based CRM system, such as the Oracle® Customer Experience Cloud (Oracle® CX Cloud), that offers a suite of cloud-based tools (or mobile applications) for customer relationship management, sales, marketing, customer service, e-commerce, price quoting, and other tools.

In one embodiment, mobile application module 145 is an application server configured with sub-modules to perform back-end operations of mobile applications for CRM, enterprise resource planning (ERP), or other business functions. In one embodiment, a CRM module may include, but is not limited to, a sales force automation (SFA) module, a marketing automation module, a contact list module, a call center support module, a web-based customer support module, a reporting and analysis module, a contact management module, a returns management authorization (RMA) module, and loyalty program module and other CRM-related modules. In one embodiment, an ERP module may include, but is not limited to, a finance and accounting module, an order processing module, a time and billing module, an inventory management and distribution module, an employee management and payroll module, a calendaring and collaboration module, a reporting and analysis module, a retail point of sale (POS) module, a product information management (PIM) module, a demand/material requirements planning (MRP) module, a purchasing module, and other ERP-related modules. In one embodiment, mobile application module 145 may also include other modules, for example, content management system (CMS) and human resources management modules. Further, mobile application server system 105 may further include user administration modules for governing the access of mobile application clients or other access by tenants and users to mobile application server system 105. In many cases, it will be desirable for modules of mobile application server system 105 to share methods, procedures, libraries, databases, sub-routines, variables, and/or other callable units or software components.

In one embodiment, data stores 135 are configured to provide a repository for persistently storing and managing collections of data generated and/or used by mobile application server system 105. In one embodiment, data stores 135 are operated by a database server, data storage server, or file server. In one embodiment, data stores 135 may be implemented using a network-attached storage (NAS) device or other dedicated server device. Data stores may be implemented with any suitable data storage technology, including structured query language (SQL)-based relational database management systems (RDBMS). In one embodiment, the data stores 135 may include a discrete, dedicated data store for administration of the mobile application server system 105 as well as a discrete, dedicated data store for operation of the mobile application module 145 and custom rule scripting module 150. In a multi-tenant embodiment of the mobile application server system 105, each tenant may have its own discrete, dedicated data store for operation of the mobile application module 145 and custom rule scripting module 150 that is unshared with other tenants.

In one embodiment, web interface server 140 is configured to enable remote clients (such as mobile application client 170 instances 173, 175, 177 or administration client instance 180) to access resources and/or services provided by mobile application server system 105 through network 110. In one embodiment, network 110 is the Internet. In one embodiment, network 110 is a private network. In one embodiment, the web interface server 140 is configured to include a REST data provider, an XML data provider, or other data provider.

In one embodiment, custom rule scripting module 150 is configured for creation and implementation of custom rules such as custom data validation and custom business logic to extend functions of the mobile application implemented by the mobile application server system 105 and mobile application client 170.

—Example Client-Side Script Execution—Runtime—

In one embodiment, the mobile application client 170 is a client application for accessing and manipulating data stored in data store 135 in conjunction with functions provided by mobile application module 145. For example, the mobile application client 170 may be a client application for an enterprise sales and service tool that hosts data on the data store 135. In one embodiment, the mobile application client 170 is an Oracle® CX mobile client, and the mobile application server system hosts an Oracle® CX Cloud service. The client application may be downloaded from a third-party distributor of mobile applications, such as the Google® Play store or the Apple® store, or downloaded from systems associated with the operator of mobile application server system 105. The mobile application client 170 may then be used for example by sales staff or service staff to browse sales opportunities or service requests, create new sales opportunities in the tool, submit service requests in the tool, look up contact information related sales opportunities or service requests, enter purchase orders, or perform other operations that create, read, update, or delete information in data store 135.

Figure 2:
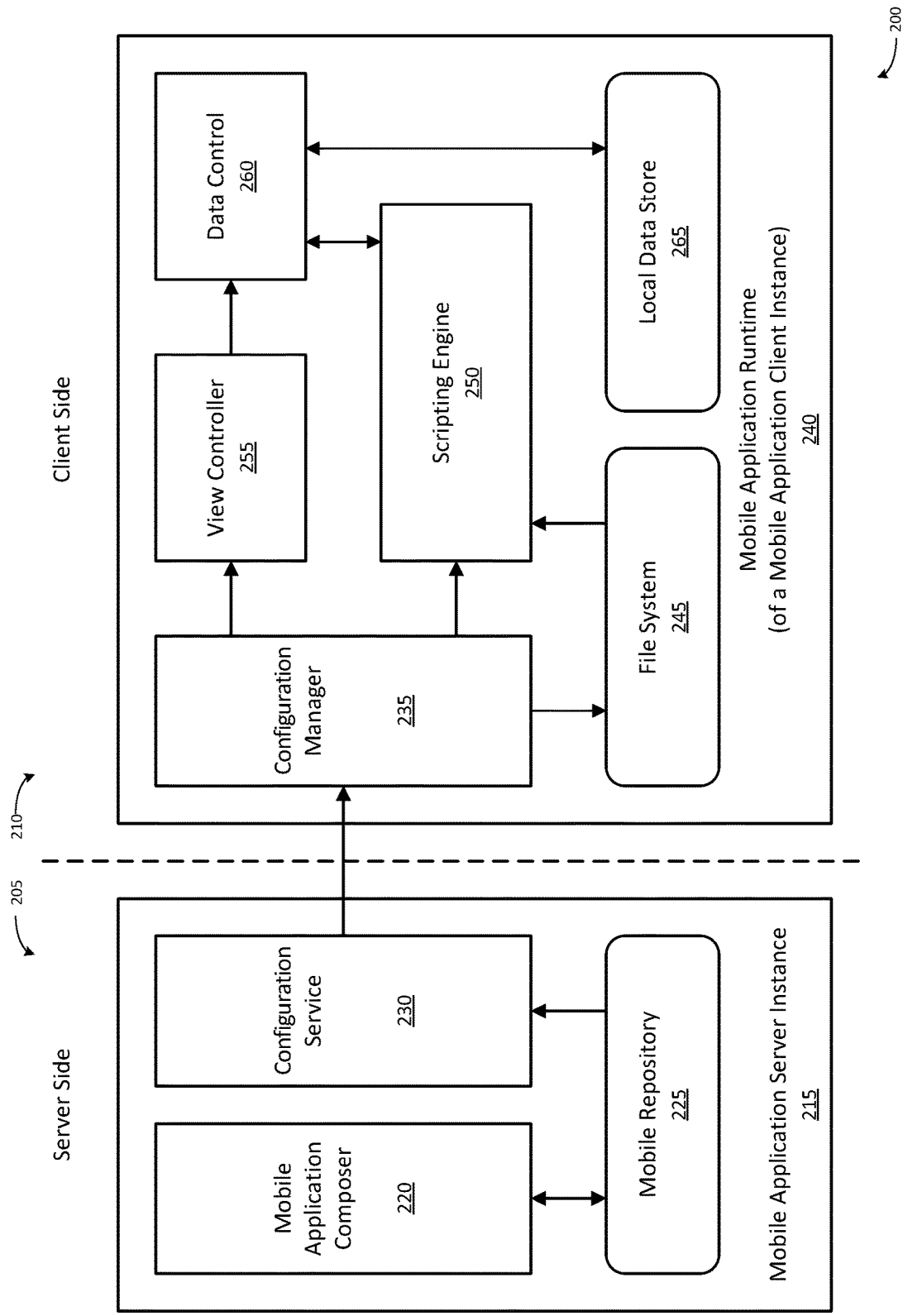
FIG. 2 illustrates one embodiment of a mobile application runtime environment associated with implementing custom validation and business logic (custom rule) scripting.

FIG. 2 illustrates one embodiment of a mobile application runtime environment 200 associated with implementing custom validation and business logic (custom rule) scripting. Environment 200 includes server-side 205 components and client-side 210 components.

On the server side 205, in one embodiment, a mobile application server instance 215 is deployed on mobile application server system 105. Mobile application server instance 215 includes mobile application composer 220, mobile repository 225, and configuration service 230.

In one embodiment, a custom rule is one or more of a validation rule and a business logic rule. In one embodiment, custom rules are scripts (written for example, in JavaScript) composed in mobile application composer 220 for execution by the mobile application server system 105 and/or mobile application client 170. Mobile application composer 220 may be implemented in whole or in part by custom rule scripting module 150, and may be implemented in part by mobile application module 145. Mobile application composer 220 includes a rule editor or script editor (for example, as described in detail herein with reference to FIGS. H, I, and L). Scripts written in mobile application composer 220 are stored in mobile repository 225. In one embodiment, mobile repository 225 may be a database or other data structure hosted by data store 135. Mobile application composer 220 also maintains one or more sandbox environments for custom rule development and testing. Scripts for a custom rule created by mobile application composer 220 are maintained within a sandbox environment until the custom rule is promoted from the sandbox environment to a production environment. In one embodiment, following the promotion to production, the custom rule is retrieved from mobile repository 225 and provided to configuration service 230.

Thus, a script for a custom rule is first created in mobile application composer 220 and stored in mobile repository 225. The script may be revised one or more times, retrieving the script from mobile repository 225, editing within mobile application composer 220, and storing the revised script again in mobile repository 225. When the script satisfactorily describes the behavior of the custom rule, the script author or other user may promote the script to production and use by the configuration service 230. The configuration service 230 is then configured to transmit the script to appropriate mobile clients.

In one embodiment, the configuration service 230 transmits the script to a configuration manager 235 operating in a mobile application runtime 240 environment of a mobile application client instance 170. The configuration manager 235 parses responses the script received from the configuration service 230 (and other messages received from application server 105) and directs information extracted by the parsing to destinations within mobile application runtime 240 environment. The configuration manager 235 stores or persists the script in file system 245, sends the script to scripting engine 250, and/or sends it to view controller 255.

In one embodiment, the mobile application client 170 requests the performance of data operations in the mobile application server 105 by generating application programming interface (API) requests to one or more data providers (such as the REST data provider or XML data provider) of the web interface server 140 with configuration manager 235 or other network interface module. In one embodiment, the requests are remote representational state transfer (REST) requests exchanged between mobile application client 170 and web interface server 140 using JavaScript object notation (JSON) as the data interchange format. In one embodiment, the requests are SOAP requests exchanged between mobile application client 170 and web interface server 140 using XML.

In one embodiment, scripting engine 250 is a script execution engine or execution environment designed to carry out scripted instructions that describe the operation of the custom rule locally on the mobile device 120. In one embodiment, the scripting engine 250 is configured to execute one or more scripts associated with one or more selected objects of the mobile application in response to the occurrence of a triggering event (or scripting event) associated with the script that indicates that the script should be executed. Scripting events used as triggering events for custom rules are listed and described in Table 1 below:

TABLE 1

| Scripting Events | |
| --- | --- |
| Event Name | Event Description |
| OnCreate | Event triggered by detecting user action on/selection of 'Create' or 'Add' button in a GUI of the mobile application client. |

TABLE 1-continued

| Scripting Events | |
| --- | --- |
| Event Name | Event Description |
| OnFieldValueChange | Event triggered by detecting user entry of changes to a a value of a field in the GUI of the mobile application client. |
| BeforeSave | Event triggered by detecting user action on/selection of 'Save' or 'Submit' or 'Checkout' (in the vertical) button on the GUI of the mobile application client, and performed before the data is committed to persistence. |
| AfterSave | Event triggered by the user action on/selection of 'Save' or 'Submit' or 'Checkout'(In the vertical) button on the GUI of the mobile application client, and performed after the data is committed to persistence. |

The triggering event may be detected by parsing operations of the mobile application performed by data control module 260. The custom rule execution engine 250 then executes the script to cause the custom rule to be enforced in conjunction with the operations performed by data control module 260.

Custom rule execution engine 250 may include, for example, a JavaScript execution engine, such as Nashorn (available at http://openjdk.java.net/projects/nashorn/), GraalJS (available at http://openjdk.java.net/projects/graal/), or JSCore (available at jscore.sourceforge.net/), specially configured in accordance with the systems and methods described herein. Note that Nashorn may be preferable to GraalJS due to a significantly lower library size (2 MB and 18 MB, respectively). Further, Nashorn may be preferable to JSCore because JSCore may not be suitable for standalone operation outside the context of a web page view. Note that the GraalJS engine offers time boxing and memory boxing functionality not necessarily offered by the Nashorn engine. Both Graal JS and Nashorn enable implementation of security features such as restricting access to Java application programming interfaces (APIs). In another embodiment, the custom rule execution 215 may include an expression language execution engine. In another embodiment, the custom rule execution engine 215 may include an Apache® Groovy execution engine.

Note that the scripting engine 250 may also execute certain system 'helper' functions or JavaScript wrapper APIs that enable executing scripts to interact with data objects in the mobile application runtime 240. The wrapper APIs and system functions are listed and described in Table 2 below:

TABLE 2

| JavaScript Wrapper APIs and System Helper Functions | |
| --- | --- |
| Wrapper API | API Description |
| CreateNewRow | Provides ability to create a new row for a given resource. This new row instance should be based off the REST metadata. Provides ability to shape the row with desired columns. |
| GetCurrentRow | Retrieves and provides access to current 'in focus' row that the user is interacting with, manipulating, or working on. |
| Query Object | Provides ability to look up an object instance or collection within the transaction(uncommitted) data. In one vertical example, this is used in a consumer goods use case with Order and Order Line objects which are disjoint. |

TABLE 2-continued

JavaScript Wrapper APIs and System Helper Functions

| Wrapper API | API Description |
|---|---|
| | Provides ability to query an object instance from the local persistence (for example in local data store 265 or file system 245). Provides ability to query for a collection of a given object from the local persistence. |
| Helper Function | Function Description |
| getUserPreferences | Retrieves and provides access to user preferences. |

Mobile application runtime includes a data control module 260. In one embodiment, data control module 260 includes the logic for performing non-customized features of the mobile application client 170. In one embodiment, the data control module includes a baseline set of operations and objects that may be further extended or modified by the execution of custom rules by scripting engine 250. Example custom rules that may be enforced on the client-side include, but are not limited to: (1) conditionally making fields mandatory and/or conditionally read-only; (2) conditionally showing and/or hiding fields on a graphical user interface layout; (3) performing field validation actions, for example, checking that a close-date is greater than 'today,' checking that Revenue=Quantity*Amount−Discount, or checking that a revenue amount is greater than a value specified in the logic; (4) conditionally enabling and/or disabling buttons (such as the "save" button, for example) based on one or more values entered in fields or based on validation actions performed on the fields; (5) automatically populating a field based on formula expressed in a script; (6) initially pre-populating one or more fields at page creation (on create page) by querying for an object and assigning a returned value to a field—for example, when creating an opportunity from an account, pre-populating the country based on the country on the account; and (7) disabling server-side scripts for transactions being performed on the mobile application client.

In one embodiment, local data store 265 may be included in mass data storage 1670 or memory 1680, of a mobile device 1600 (as shown and described with reference to FIG. 16). The mobile application client 170 may store data from mobile application server system 105 (for example retrieved from data store 135) in local data storage 265. The data in the local data storage 265 may be manipulated by a user of the mobile application client 170 through view controller 255. In one embodiment, view controller 255 controls presentation of a graphical user interface (GUI) for the mobile client application 170, for example using display 1650 and input device 1660 (as shown and described with reference to FIG. 16).

In one embodiment, the mobile application client 170 is configured to perform offline operations and deferred synchronization when connectivity between the mobile application client 170 and the mobile application server system 105 is limited or absent. Such operation may be referred to as an "offline mode." In offline mode, while connectivity between mobile application client 170 and mobile application server system 105 is limited or absent, data in the local data storage 265 may include a local cache of data from mobile application server system 105. The data in the local cache may be manipulated by a user of the mobile application client 170 through view controller 255 while the mobile application client 170 is in offline mode, and the modifications to the data later synchronized with the server side when connectivity is restored.

—Example Method for Custom Rule Scripting—

In one embodiment, each step of computer-implemented methods described herein may be performed by a processor (such as processor 1510 as shown and described with reference to FIG. 15) of one or more computing devices (i) accessing memory (such as memory 1515 and/or other computing device components shown and described with reference to FIG. 15) and (ii) configured with logic to cause the system to execute the step of the method (such as custom rule scripting logic 1530 shown and described with reference to FIG. 15). For example, the processor accesses and reads from or writes to the memory to perform the steps of the computer-implemented methods described herein. These steps may include (i) retrieving any necessary information, (ii) calculating, determining, generating, classifying, or otherwise creating any data, and (iii) storing any data calculated, determined, generated, classified, or otherwise created. References to storage or storing indicate storage as a data structure in memory or storage/disks of a computing device (such as memory 1515, or storage/disks 1535 of computing device 1505 or remote computers 1565 shown and described with reference to FIG. 15).

In one embodiment, each subsequent step of a method commences in response to parsing a signal received or stored data retrieved indicating that the previous step has been performed at least to the extent necessary for the subsequent step to commence. Generally, the signal received or the stored data retrieved indicates completion of the previous step.

Figure 3:
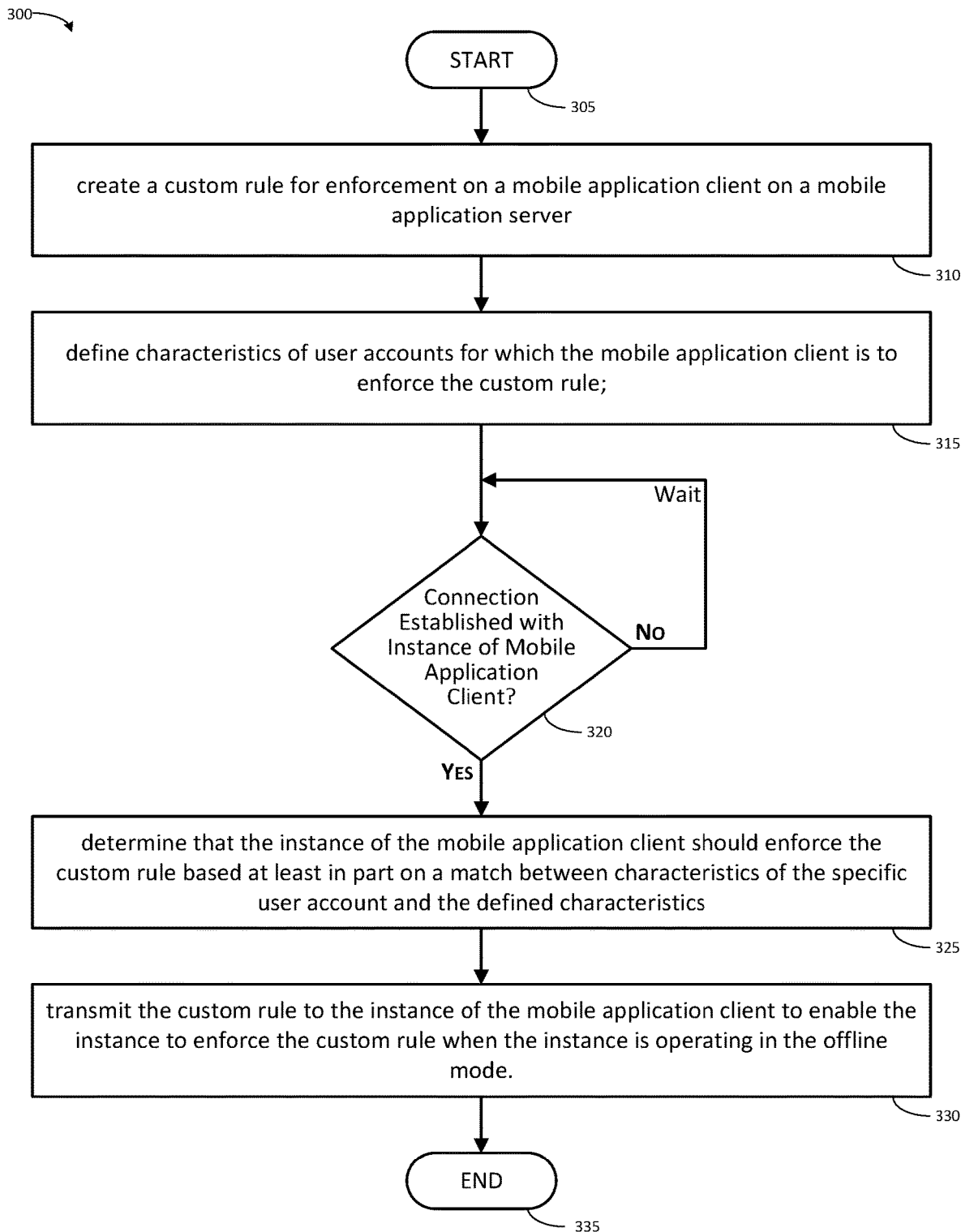
FIG. 3 illustrates one embodiment of a method associated with implementing custom validation and business logic (custom rule) scripting.

FIG. 3 illustrates one embodiment of a method 300 associated with implementing custom validation and business logic (custom rule) scripting. In one embodiment, the method 300 is a computer-implemented method for enabling client-side enforcement of custom rules in offline in offline mode operation. In one embodiment, the steps of method 300 are performed by mobile application server instance 215 (as shown and described with reference to FIG. 2 and other figures herein). In one embodiment, mobile application server instance 215 is implemented by mobile application server system 105. In one embodiment, mobile application server system 105 is a special purpose computing device or collection of special purpose computing devices (such as computing device 1505) configured with custom rule scripting logic 1530.

The method 300 may be initiated based on various triggers, such as receiving a signal over a network or parsing stored data indicating that (i) a user (or administrator) of mobile application server system 105 has initiated method 300, (ii) that method 300 is scheduled to be initiated at defined times or time intervals, (iii) that a mobile application client instance 170 has initiated contact with mobile application server instance 215 and/or mobile application server system 105, or (iv) that a mobile application client instance has resumed network connectivity with mobile application server instance 215 and/or mobile application server system 105 after operating in offline mode. The method 300 initiates at START block 305 in response to parsing a signal received or stored data retrieved and determining that the signal or stored data indicates that the method 300 should begin. Processing continues to process block 310.

At process block 310, the processor creates a custom rule for enforcement on a mobile application client on a mobile application server.

In one embodiment, the mobile application client is configured to enforce one or more custom rules when operating in offline mode. For example, the mobile application client may be configured with a scripting engine 250, as shown and described with reference to FIG. 2. The custom rule is configured to be executed by the scripting engine 250. In one embodiment, the processor accepts a series of user inputs that describe the operation of the custom rule. The processor stores the series of user inputs in a data structure in data stores 135, for example, in mobile repository 225. The processor accepts a user input that indicates that the custom rule is satisfactory, such as a user input indicating that the custom rule should be moved from a sandbox environment to a production environment that configures a mobile client to enforce the custom rule. The processor then marks the custom rule in mobile repository 225 for use in a production environment, thereby creating a custom rule for enforcement on a mobile application client.

In one embodiment, the custom rule is a script, and the mobile application client is configured to execute scripts (using the scripting engine 250) to enforce custom rules without requiring changes to a build of the mobile application client. For example, the user inputs include interpreted programming language scripts, such as JavaScript scripts.

Figure 4:
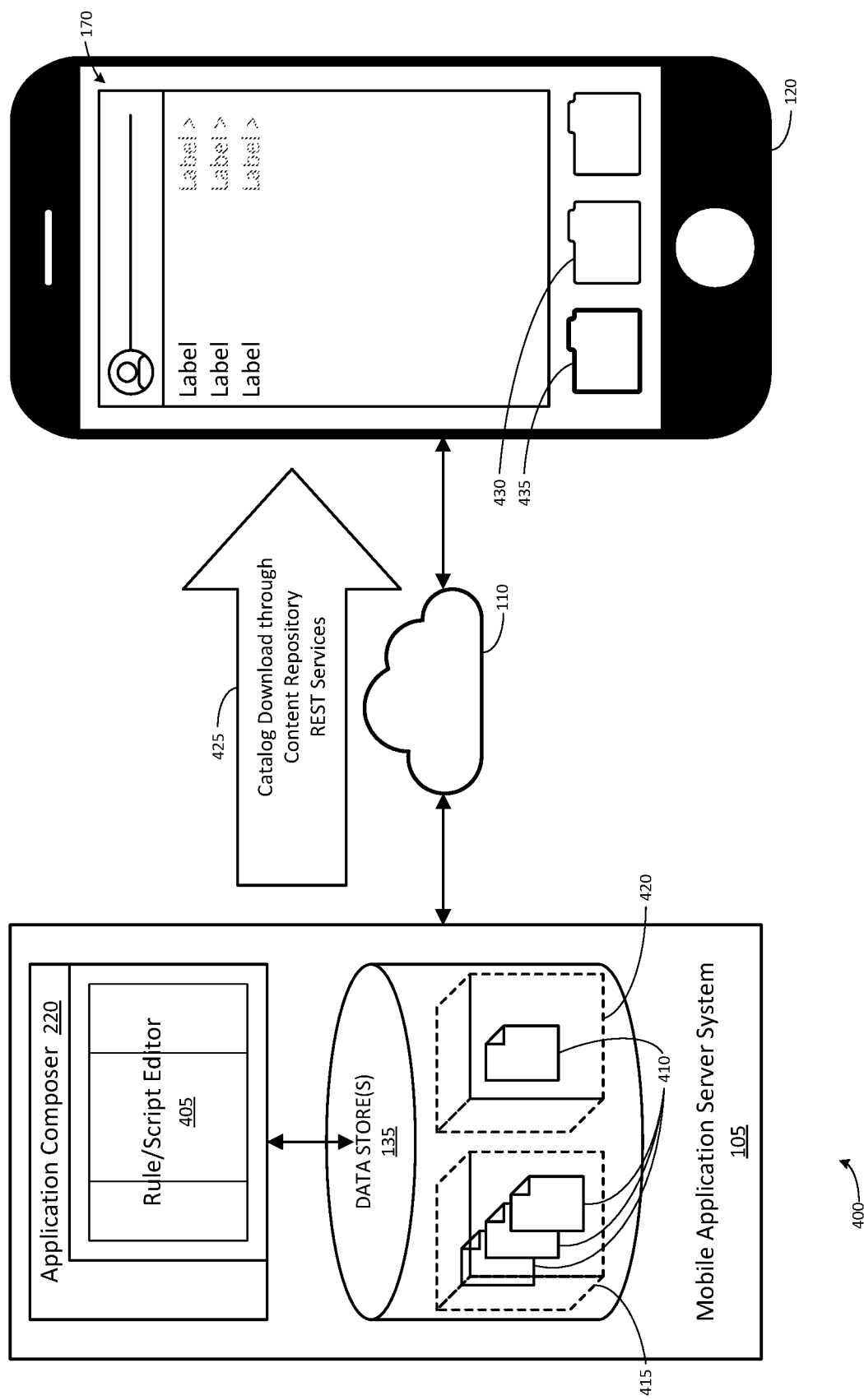
FIG. 4 illustrates an example script authoring system associated with implementing custom validation and business logic (custom rule) scripting.

FIG. 4 illustrates an example script authoring system 400 associated with implementing custom validation and business logic (custom rule) scripting. In one embodiment, script authoring system 400 is implemented by mobile application server system 105. As discussed above, mobile application server system 105 includes an application composer 220, which includes a rule/script editor 405. In one embodiment, processors (and other hardware) of mobile application server 105 execute the rule/script editor 405 to accept inputs that create or modify scripts. The resulting scripts 410 are transmitted to data store 135 where they are stored, for example as part of mobile repository 225.

Referring again to FIG. 3, once the processor has thus completed creating a custom rule for enforcement on a mobile application client on a mobile application server, processing at process block 310 completes, and processing continues to process block 315.

At process block 315, the processor defines characteristics of user accounts for which the mobile application client is to enforce the custom rule. In one embodiment, the processor accepts one or more user inputs that describe the characteristics of accounts for which the custom rule is applicable, and stores the user inputs in a database in association with the custom rule, for example in mobile repository 225. In one embodiment, the characteristics include one or more of (i) a location, such as a region, country, province or state, city, in which the custom rule is relevant to transactions; and (ii) a business role (for example, sales representative, business practices director, channel operations manager, etc.) performed by the user, for which the custom rule is relevant to the duties or authority of the business role. In one embodiment, the default value for location is "global," indicating applicability to all locations, and the value may be changed to a more specific location in response to user input. For example, the processor causes a graphical user interface to display a list (for example a searchable list) of all available regions which can be assigned to the custom rule, which may accept a selection of a region. In one embodiment, the default value for role is "all personnel," indicating applicability to all users of the system, and the value may be changed to a more specific group of user roles in response to user input. For example, the processor causes a graphical user interface to display a selectable list (which may further be searchable) of all available user roles (that is, job titles or responsibilities) which can be assigned to the custom rule. The processor parses and records any selections that change the default values. The processor records the locations and business roles for which the custom rule is relevant in mobile repository 225 in association with the custom rule, for example in a common data structure.

Referring again to FIG. 4, the scripts 410 are associated in the database with a namespace for the characteristics. For example, some of scripts 410 are associated with 'region' namespace 415, while others are associated with 'role' namespace 420. Each script 410 in a namespace, 415, 420 is uniquely identified within that namespace. Thus, in one embodiment, the namespaces may be striped by regions or other criteria.

Referring again to FIG. 3, once the processor has thus completed defining characteristics of user accounts for which the mobile application client is to enforce the custom rule, processing at process block 315 completes, and processing continues to decision block 320.

At decision block 320, the processor determines whether a network connection has been established between an instance of the mobile application client associated with a specific user. The processor monitors incoming requests (such as REST requests) to web interface server 140 and to configuration service 230 for connections with mobile application client instances. The processor parses the requests to identify their source and a specific user account with which they are associated. If the processor determines that a network connection between an instance of the mobile application client associated with a specific user has not been established (decision block 320: NO), the processor waits for the establishment of such a connection, continuing to monitor incoming connections. In one embodiment, the processor specifically monitors for login requests from a mobile application client associated with the specific user account. The association may be based on login credentials provided, where the user account is identified based on one or more of a username and password. If the processor determines that a network connection between an instance of the mobile application client associated with a specific user has been established (decision block 320: YES), processing at decision block 320 completes, and processing continues to process block 325.

At process block 325, the processor determines that the instance of the mobile application client should enforce the custom rule based at least in part on a match between characteristics of the specific user account and the defined characteristics. The processor retrieves the records the locations and business roles for which the custom rule is relevant from mobile repository 225. The processor parses the records to identify the locations and business roles for which the custom rule is relevant. For example, the processor may extract data indication the custom rule should be applied for user accounts associated sales representatives in California. The processor retrieves a record describing the characteristics of the specific user account, such as a human resources (HR) record of the user associated with the account. The processor parses the HR (or other account-specific) record to identify locations and/or business roles assigned to the specific user. For example, the processor may identify that the specific user is a sales representative with assigned territory in California. Where locations and/or assigned business roles match between the record describing the relevance of the custom rule and the characteristics of the specific user account, the processor will determine that the instance of the mobile application client should enforce the custom rule because of the match. Where locations and/or assigned business roles do not match between the record describing the relevance of the custom rule and the characteristics of the specific user account, the processor will determine that the instance of the mobile application client should not enforce the custom rule because of the match. Note that the process may end early under this condition.

Thus, in one embodiment, the characteristics of the user accounts include one or more of (i) a geographical region associated with the user accounts and (ii) a user role associated with the user accounts.

Once the processor has thus completed determining that the instance of the mobile application client should enforce the custom rule based at least in part on a match between characteristics of the specific user account and the defined characteristics, processing at process block 325 completes, and processing continues to process block 330.

At process block 330, in response to the determination that the instance of the mobile application client should enforce the custom rule, the processor transmits the custom rule to the instance of the mobile application client to enable the instance to enforce the custom rule when the instance is operating in the offline mode. In one embodiment, the processor retrieves the custom rule from storage in mobile repository 225. The processor generates a REST request that includes the custom rule as a payload and that instructs the instance of the mobile application client to apply the custom rule to data operations performed locally by the instance. The processor transmits the REST request from configuration service 230 (in mobile application server system 105) over network 110 to configuration manager 235 (in mobile application instance 170) to enable the instance to enforce the custom rule when the instance is operating in offline mode.

In one embodiment, the processor generates a catalog including modified and or new scripts based on a current update status of mobile application instance 170. The processor transmits the catalog over network 110 to the mobile application client instance 170 using Oracle's® content repository rest services, as shown at 425. In response to receiving the custom rule, mobile application client instance 170 on mobile device 120 updates application catalog 430 to a current state based on the newly received custom rule (in the catalog download 425), for example as a data structure in file system 245 and/or local data store 265. From the updated application catalog 430, in response to the update, the mobile application client instance 170 generates a current, active application version 435 executed by mobile device 120.

Once the processor has thus completed transmitting the custom rule to the instance of the mobile application client, processing at process block 330 completes, and processing continues to END block 335, where process 300 ends.

—Example Offline Mode Operation Method—

Figure 5:
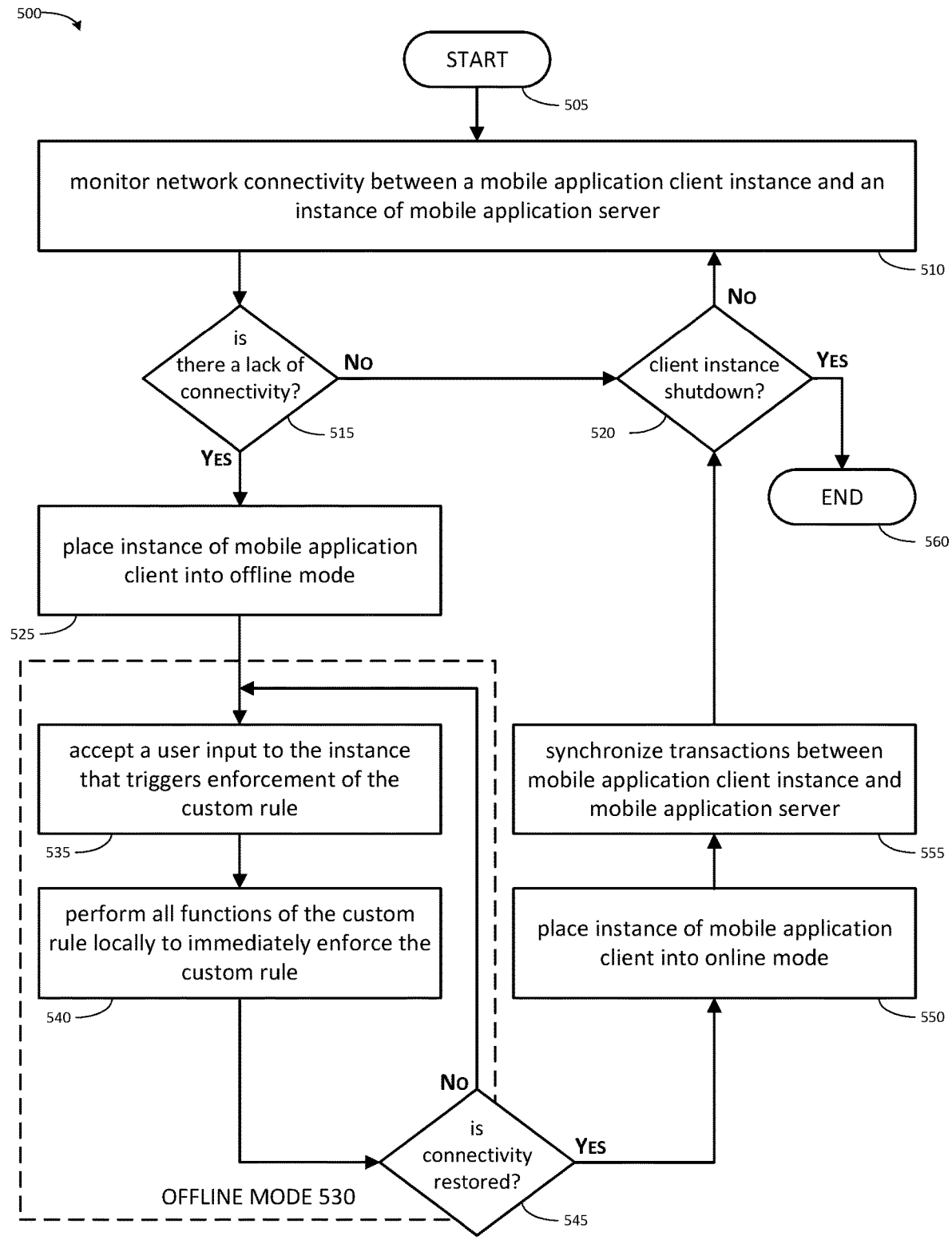
FIG. 5 illustrates one embodiment of a method associated with implementing custom validation and business logic (custom rule) scripting in 'offline mode' operation of a mobile application client.

FIG. 5 illustrates one embodiment of a method 500 associated with implementing custom validation and business logic (custom rule) scripting in 'offline mode' operation of a mobile application client. In one embodiment, the method 500 is a computer-implemented method for enabling client-side enforcement of custom rules in offline in offline mode operation. In one embodiment, the steps of method 500 are performed by mobile application client instance 170 (as shown and described with reference to FIG. 1 and other figures herein). In one embodiment, mobile application client instance 170 is implemented by a mobile device 120. In one embodiment, mobile device 120 is a special purpose mobile device (such as mobile device 1600 shown and described with reference to FIG. 16) configured with custom rule scripting logic 1605. References to a processor in method 500 may include signal processing and control circuits 1620.

The method 500 may be initiated based on various triggers, such as receiving a signal over a network or parsing stored data indicating that (i) a mobile application client instance 170 has been initiated or started-up in a mobile device 120; (ii) the mobile device 120 has, or does not have, network connectivity with mobile application server system 105; (iii) that a mobile application client instance 170 has received a communication (such as a REST request) from mobile application server instance 215 and/or mobile application server system 105, or (iv) that a mobile application client instance 170 has resumed network connectivity with mobile application server instance 215 and/or mobile application server system 105 after operating in offline mode. In one embodiment, method 500 starts in response to the completion of method 300. The method 500 initiates at START block 505 in response to parsing a signal received or stored data retrieved and determining that the signal or stored data indicates that the method 500 should begin. Processing continues to process block 510.

At process block 510, the processor monitors network connectivity between mobile application client instance and an instance of a mobile application server. In one embodiment, the processor monitors network connectivity to determine whether or not the connectivity should be classified with as status of 'unavailable' or "offline" or otherwise indicate that there is a lack of connectivity. In one embodiment, the processor of mobile device 120 detects whether web interface server 140 is unavailable. For example, the processor may ping the internet protocol (IP) address of web interface server 140 to determine the network latency between the mobile device 120 and web interface server 140. The processor then compares the detected network latency to a threshold that indicates that the network connection between the mobile device 120 and web interface server 140 is slow, poor, or otherwise limited. In another example, the processor may detect that the network is disconnected between the mobile device 120 and web interface server 140 by pinging the IP address of web interface server 140 and determining that no response is received from the servers. In another example, the processor may detect that the first remote service provider has low or no availability by receiving and parsing a message from the first remote service provider that it is offline or busy. In another example, the processor may access device status information of mobile device 120 that indicates whether or not there is access to adequate WI-FI (IEEE 802.11x) signal, or to adequate cellular signal to support operations. Monitored data that indicates the status of the network connectivity is saved for later processing, for example in local data store 265 or file system 245. Once the processor has thus completed monitoring network connectivity between mobile application client instance and an instance of a mobile application server, processing at process block 510 completes, and processing continues to decision block 515.

At decision block 515, the processor detects whether there is a lack of network connectivity to the mobile application server. In one embodiment, the monitored data is retrieved from storage and evaluated to determine the state of connectivity. For example, the monitored data may be compared to a threshold, or the device status information reviewed, to determine whether a sufficient network connection to the mobile application server is present. If there is no lack of connectivity (process block 515: NO), processing at decision block 515 ends, and processing continues to decision block 520. If there is a lack of connectivity (process block 515: YES), processing at decision block 515 ends, and processing continues to decision block 525.

At process block 525, the processor places the instance of the mobile application client into offline mode 530. In one embodiment, the processor configures the mobile application client instance 170 to cease attempting to access and manipulate data hosted on mobile application server system 105. The processor then configures the mobile application client instance 170 to commence accessing and manipulating a local copy of that data locally within the mobile application runtime 240. The processor also configures the mobile application client instance 170 to commence persisting the sequence of changes to data locally on the mobile device 120 for later synchronization with server side data store 135 when offline mode 530 ends and interactions with the mobile application server system 105 resume. This may be referred to as referred to as "offline write" or "deferred write access." The processor further configures the mobile application client instance 170 to apply local copies of custom rules to the operations of application client instance 170 executed by mobile device 120 in accordance with active application version 435. Once the processor has thus completed placing the instance of the mobile application client into the offline mode 530, processing at process block 525 completes, and processing continues to process block 535.

Following process block 525, mobile application client instance 170 is operating in the offline mode 530. At process block 535, while the mobile application client instance is operating in the offline mode 530, the processor accepts a user input to the instance of the mobile application client that triggers enforcement of the custom rule. In one embodiment, the processor parses a user input to determine what objects are created or modified by the user input, and what triggering scripting events (OnCreate, OnFieldValueChange, BeforeSave, and/or AfterSave) has occurred due to the action. Based on the triggering event that has occurred, the processor searches the custom rules to determine if there is a custom rule associated with the triggering event for any of the objects created or modified by the user input. The processor identifies whether or not there is a custom rule script to be executed by the scripting engine. If the search returns no result, no custom rule script will be executed. If the search does return results identifying one or more custom rule scripts associated with created/modified objects, the corresponding custom rule script will be performed for the associated object(s). Once the processor has thus completed accepting a user input to the instance of the mobile application client that triggers enforcement of the custom rule, processing at process block 535 completes, and processing continues to process block 540.

At process block 540, the processor performs all functions of the custom rule locally by the instance of the mobile application client to immediately enforce the custom rule. In one embodiment, the processor retrieves the one or more custom rule scripts to be executed from local data store 265 or file system 245. (In one embodiment, the custom rule scripts are retrieved from application catalog 430). The processor then executes the scripting engine 250 to perform the ordered steps described by each custom rule script. The execution of the scripting engine 250 occurs within the mobile application runtime 240 on the client-side mobile device, removing any need for server-side operations to give immediate effect to the custom rule. Note that 'immediate' enforcement of the rule does not necessarily mean instantaneous enforcement, although it might. Rather, here, immediate enforcement or effect of the custom rule indicates the opposite of delays for later synchronization caused by lack of network connectivity to server-side processing systems. The systems and methods herein generally exhibit reasonably real-time performance, without excessive lag due to local processing.

In one embodiment, a GUI presented by the instance of the mobile application client 170 displays the results of the custom rule immediately following acceptance of an input that triggers the custom rule.

Once the processor has thus completed performing all functions of the custom rule locally by the instance of the mobile application client to immediately enforce the custom rule, processing at process block 540 completes, and processing continues to decision block 545.

At decision block 545, the processor retrieves data from ongoing monitoring process described at process block 510. The processor analyzes the retrieved data to determine if network connectivity has been restored. If network connectivity has not been restored (decision block 545: NO), processing at decision block 545 completes and the processing remains in offline mode 530 and returns to process block 535 to await subsequent user inputs. If network connectivity has been restored (decision block 545: YES), processing at decision block 545 completes and processing continues at process block 550.

At process block 550, the processor places the instance of the mobile application client 170 into online mode. In one embodiment, the processor then configures the mobile application client instance 170 to cease accessing and manipulating the local copy of data locally within the mobile application runtime 240. The processor also configures the mobile application client instance 170 to stop persisting new changes for later synchronization. The processor then configures the mobile application client instance 170 to commence or restart accessing and manipulating data hosted on mobile application server system 105. The processor further configures the mobile application client instance 170 to apply server-side copies of custom rules to the operations of client instance 170, to ensure that the latest version of the custom rules are applied. Once the processor has thus completed placing the instance of the mobile application client into online mode again, processing at process block 550 completes, and processing continues to process block 555.

At process block 555, the processor synchronizes the transactions between the mobile application client instance and the mobile application server. In one embodiment, the processor retrieves the persisted sequence of changes to data from local data store 265. The processor then transmits the persisted sequence of changes over network 110 to web interface server 140 for synchronizing with server-side data store 135. Once the processor has thus completed synchronizing the transactions between the mobile application client instance and the mobile application server, processing at process block 555 completes, and processing returns to decision block 520.

At decision block 520, the processor checks to see if the mobile application client instance has shut down or is shutting down (or has otherwise terminated). If so (decision block 520: YES), then the process proceeds to END block 560, where method 500 ends. If not, (decision block 520: NO), processing returns to process block 510, where method 500 resumes monitoring network connectivity.

—Providing Supporting Data to the Client Instance—

FIG. 6 illustrates one embodiment of a method 600 associated with implementing custom validation and business logic (custom rule) scripting with supporting data in 'offline mode' operation of a mobile application client. In one embodiment, the steps of method 600 are performed by mobile application server instance 215, and more particularly, configuration service 230 and mobile repository 225 (as shown and described with reference to FIG. 2 and other figures herein). In one embodiment, mobile application server instance 215 is implemented by mobile application server system 105. In one embodiment, mobile application server system 105 is a special purpose computing device or collection of special purpose computing devices (such as computing device 1505) configured with custom rule scripting logic 1530.

The method 600 may be initiated based on various triggers, for example, receiving a signal over a network or parsing stored data indicating that (i) a mobile application client instance 170 has initiated contact with mobile application server instance 215 and/or mobile application server system 105, or (ii) that a mobile application client instance has resumed network connectivity with mobile application server instance 215 and/or mobile application server system 105 after operating in offline mode. The method 600 initiates at START block 605 in response to parsing a signal received or stored data retrieved and determining that the signal or stored data indicates that the method 600 should begin. Processing continues to process block 610.

At process block 610, the processor composes a query to retrieve supporting data that is queried during enforcement of the custom rule from a mobile application database. In one embodiment, the processor parses the custom rule to determine what data sets the custom rule may query. For example, the processor may identify the data set accessed for each query executed by the custom rule. The processor will then generate one or more queries to retrieve those data sets. Once the processor has thus completed composing a query to retrieve supporting data that is queried during enforcement of the custom rule from a mobile application database, processing at process block 610 completes, and processing continues to process block 615.

At process block 615, the processor executes the query on the mobile application database to obtain the supporting data. The processor will populate one or more data structures with the retrieved data sets, and store the data sets for later transmission, for example in data store 135. Once the processor has thus completed executing the query on the mobile application database to obtain the supporting data, processing at process block 615 completes, and processing continues to process block 620.

At process block 620, the processor transmits the supporting data to the instance of the mobile application client to further enable the instance to enforce the custom rule when the instance is operating in offline mode. The processor retrieves the data sets from storage in data store 135. The processor composes a message, such as a REST request or catalog download, that includes the data sets. The processor then transmits the data sets, which make up supporting data for the operation of the custom rule, to the mobile application client instance 170 in order to support offline operation of the custom rule. Once the processor has thus completed transmitting the supporting data to the instance of the mobile application client to further enable the instance to enforce the custom rule when the instance is operating in offline mode, processing at process block 620 completes, and processing continues to END block 625, where process 600 ends.

Thus, for example, if the custom rule requires credit checks for certain purchases, the processor may parse the custom rule to determine that execution of the custom rule may cause a query to retrieve a credit rating for a customer. The processor will then create and execute a query to retrieve a data set of all credit ratings for customers from data store 135 and transmit it to the client side.

FIG. 7 illustrates a portion 700 of method 500 including an additional parallel method step associated with providing supporting data for custom rules during offline operation 530. In one embodiment, the additional step of method 500 is performed by mobile application client instance 170 (as shown and described with reference to FIG. 1 and other figures herein), for example, by a mobile device 120 as mobile device 1600 as described above. In FIG. 7, process steps 525, 535, 540 (not shown in FIG. 7), and 545 execute substantially as shown and described with reference to FIG. 5 above. In addition, once the processor has thus completed accepting a user input to the instance of the mobile application client that triggers enforcement of the custom rule, processing at process block 535 completes, and processing continues to process block 705 in parallel with process block 540. At process block 705, the processor retrieves a portion of the supporting data from local storage to enable the instance of the mobile application client to immediately enforce the custom rule. In one embodiment, in the course of performing functions of the custom rule locally, the processor executes a query described by the custom rule script, against the supporting data. The results of the query are returned to the scripting engine 250 in the mobile application runtime 240 for use in the execution of the custom rule.

—Example Update to Client-Side Custom Rules—

Figure 8:
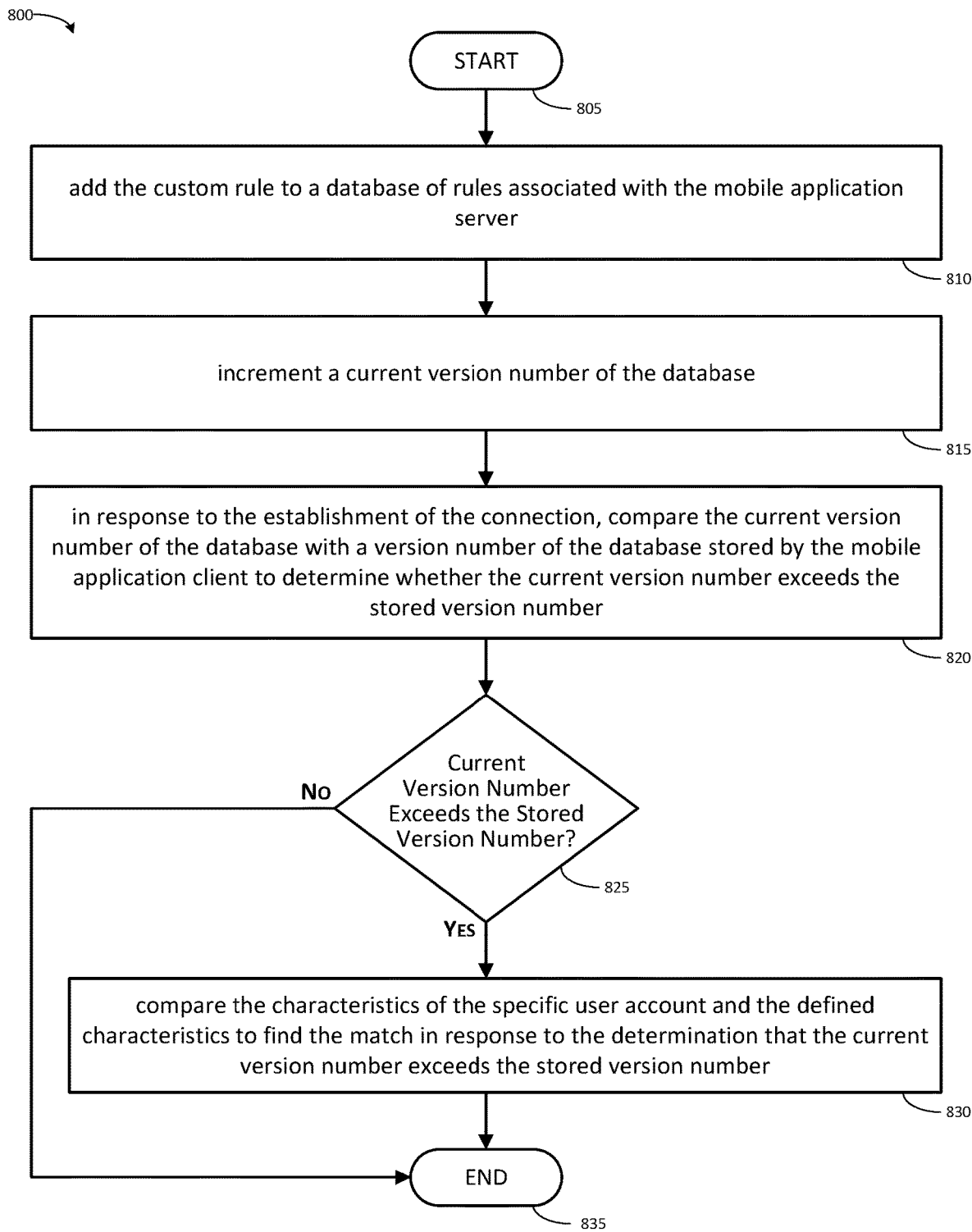
FIG. 8 illustrates one embodiment of a method associated with implementing custom validation and business logic (custom rule) scripting, and in particular, generating a selective update set of custom rules for transmission to a mobile application client instance based on user account characteristics.

FIG. 8 illustrates one embodiment of a method 800 associated with implementing custom validation and business logic (custom rule) scripting, and in particular, generating a selective update set of custom rules for transmission to a mobile application client instance 170 based on user account characteristics. In one embodiment, the steps of method 300 are performed by mobile application server instance 215, and more particularly, configuration service 230 and mobile repository 225 (as shown and described with reference to FIG. 2 and other figures herein). In one embodiment, mobile application server instance 215 is implemented by mobile application server system 105. In one embodiment, mobile application server system 105 is a special purpose computing device or collection of special purpose computing devices (such as computing device 1505) configured with custom rule scripting logic 1530.

The method 800 may be initiated based on various triggers, such as receiving a signal over a network or parsing stored data indicating that (i) one or more new custom rules have been created, for example by completion of process 300; (ii) one or more custom rules have been uploaded to mobile application server system 105. In one embodiment, method 800 starts in response to the completion of method 300. The method 800 initiates at START block 805 in response to parsing a signal received or stored data retrieved and determining that the signal or stored data indicates that the method 800 should begin. Processing continues to process block 810.

At process block 810, the processor adds the custom rule to a database of rules associated with the mobile application server. In one embodiment, the processor creates a new entry within the database, and writes the script that defines the custom rule, any locations for which the custom rule is specifically applicable, and any user roles for which the custom rule is specifically applicable to the fields of the new entry. In one embodiment, this server-side database of rules is the complete listing of all custom rules available in the mobile application system. Once the processor has thus completed adding the custom rule to a database of rules associated with the mobile application server, processing at process block 810 completes, and processing continues to process block 815.

At process block 815, the processor increments a current version number of the database. In one embodiment, metadata of the database of rules indicates a version of the database. In one embodiment, the processor increments the version number in the metadata in response to each edit to a preexisting rule, or addition of a newly created rule. Once the processor has thus completed incrementing a current version number of the database, processing at process block 815 completes, and processing continues to process block 820.

At process block 820, in response to the establishment of the connection, the processor compares the current version number of the database with a version number of the database stored by the mobile application client to determine that the current version number exceeds the stored version number. The stored version number indicates the version of the server-side database last accessed by the mobile application client. The current version number of the database indicates the most recently revised database. Note that, in practice, the current version number should never be less than the stored version number, because the stored version number should only ever be updated to be equal to the current version number. Only the current version number (for the server-side database of custom rules) is ever affirmatively incremented due to changes to the content of the database. In one embodiment, the processor retrieves the current version number from metadata of the server-side database of rules. The processor parses a REST request (for example, a request to log-in) from the mobile application client instance 170 to extract the stored version number. The log-in or other REST request to the mobile application server system 105 should be configured by the mobile application client instance 170 to include the stored version number. The processor then compares the current version number and the stored version number to determine the difference, if any, between them. Once the processor has thus completed comparing the current version number of the database with a version number of the database stored by the mobile application client to determine that the current version number exceeds the stored version number, processing at process block 820 completes, and processing continues to decision block 825.

At decision block 825, the processor determines whether the current version number exceeds the stored version number. If the current version number (from the server side) exceeds the stored version number (from the client side) (decision block 825: YES), then processing at decision block 825 completes and processing continues at process block 830. If the current version number (from the server side) does not exceed the stored version number (from the client side) (decision block 825: NO), then processing at decision block 825 completes and processing continues at to END block 835, where process 800 ends. Note that this determination is a pre-test to determine whether or not the stored database may require updates. If the stored version number and current version number match, (current version does not exceed stored version), there is no need to update the stored version. If the stored version number and current version number do not match (current version exceeds stored version) there may be a need to update the stored version, and the processor proceeds to the more in-depth process for determining if there is truly a need to update.

At process block 830, the processor compares the characteristics of the specific user account and the defined characteristics to find the match. In one embodiment, the processor retrieves and parses an HR (human resources) record associated with the specific user account. The processor extracts the roles of the user from the HR record. The processor also extracts the regions in which the user is active from the HR record. The processor then queries the database to determine if any custom rules newer than the stored version match the extracted regions or extracted roles. If so, the processor then retrieves those custom rules, and transmits them to the mobile application client instance 170 to add to or replace previous versions of the custom rules in the stored version, and the stored version number is updated to equal the current version. If there are no custom rules that match the extracted regions or roles newer than the store, then the stored version number is simply updated to equal the current version, because no relevant updates were present. Once the processor has thus completed comparing the characteristics of the specific user account and the defined characteristics to find the match, processing at process block 830 completes, and processing continues at to END block 835, where process 800 ends.

Thus, in one embodiment, as part of a mobile application client update or synchronization process occurring when a user reconnects to the mobile application server system, the mobile application client will download custom rule scripts associated with the user's region or role in a business organization. Further, supporting data for operation of the custom rule scripts may also be downloaded at the same time, if applicable. In short, the scripts are bundled with mobile application update, and only those scripts that are modified (or new) are included as a part of the catalog of scripts provided in the update bundle.

—Application of Rules to Objects and Events—

Figure 9:
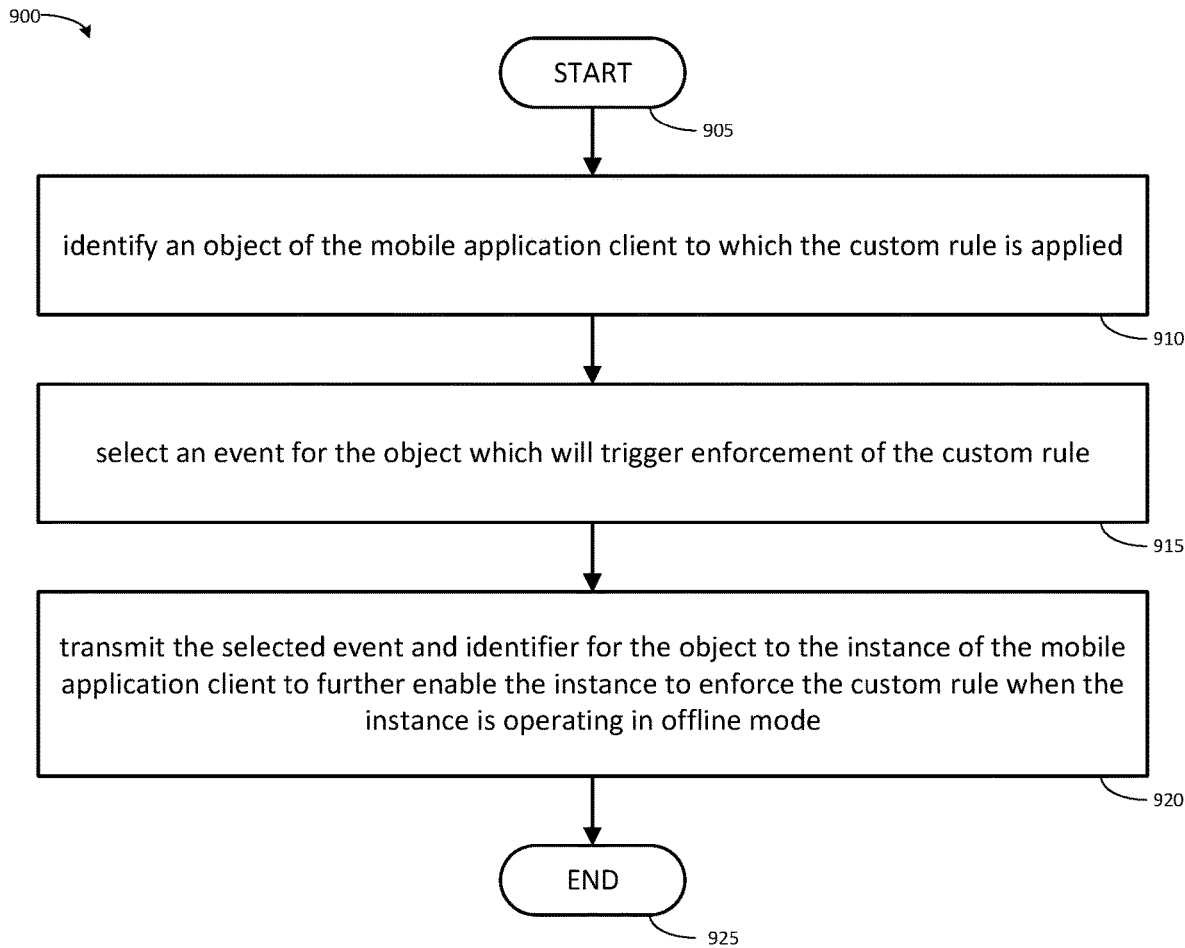
FIG. 9 illustrates one embodiment of a method associated with implementing custom validation and business logic (custom rule) scripting, and in particular, associating mobile application objects and trigger events with custom rules.

FIG. 9 illustrates one embodiment of a method 900 associated with implementing custom validation and business logic (custom rule) scripting, and in particular, associating mobile application objects and trigger events with custom rules. In one embodiment, method 900 further refines the step of creating a custom rule in method 300. In one embodiment, the steps of method 900 are performed by mobile application server instance 215, and more particularly mobile application composer 220 (as shown and described with reference to FIG. 2 and other figures herein). In one embodiment, mobile application server instance 215 is implemented by mobile application server system 105. In one embodiment, mobile application server system 105 is a special purpose computing device or collection of special purpose computing devices (such as computing device 1505) configured with custom rule scripting logic 1530.

The method 900 may be initiated based on various triggers, such as receiving a signal over a network or parsing stored data indicating that (i) rule/script editor client 180 has accessed the custom rule; (ii) one or more new custom rules have been created, for example by completion of process 300; (iii) one or more custom rules have been uploaded to mobile application server system 105; and (iv) commencement or completion of processing in of process block 310 of method 300. In one embodiment, method 900 starts in response to the completion of method 300. The method 900 initiates at START block 905 in response to parsing a signal received or stored data retrieved and determining that the signal or stored data indicates that the method 900 should begin. Processing continues to process block 910.

At process block 910, the processor identifies an object of the mobile application client to which the custom rule is applied. In one embodiment, the processor accepts a user input indication that the custom rule should be applied to the object. The user input may be provided through the rule/script editor client 180. The processor then records the association between the object and the custom rule in metadata of the object, the custom rule, or both. Processing at process block 910 then completes, and processing continues to process block 915.

At process block 915, the processor selects an event for the object which will trigger enforcement of the custom rule. In one embodiment, in response to an indication that the custom rule should be applied to the object, the user, through rule/script editor client 180, is presented with a set of triggering events (OnCreate, OnFieldValueChange, BeforeSave, and AfterSave, as discussed above) from which to select. The processor accepts a user input selection (through the rule/script editor client) of the triggering event that will trigger enforcement of the rule. The processor then records the association between the object, custom rule, and triggering event in in metadata of the object, the custom rule, or both. The association can be later parsed, for example by data control module 260 or scripting engine 250. Processing at process block 915 then completes, and processing continues to process block 920.

At process block 920, the processor transmits the selected trigger event and identifier for the object to the instance of the mobile application client to further enable the instance to enforce the custom rule when the instance is operating in offline mode. In one embodiment, the processor generates a REST request including the selected triggering event and identifier as payload. For example, these may be included with the custom rule itself when it is transmitted to the instance of the mobile application. Processing at process block 920 then completes, and processing continues to END block 925, where process 900 ends.

—Example Rule/Script Editor GUI—

Figure 10:
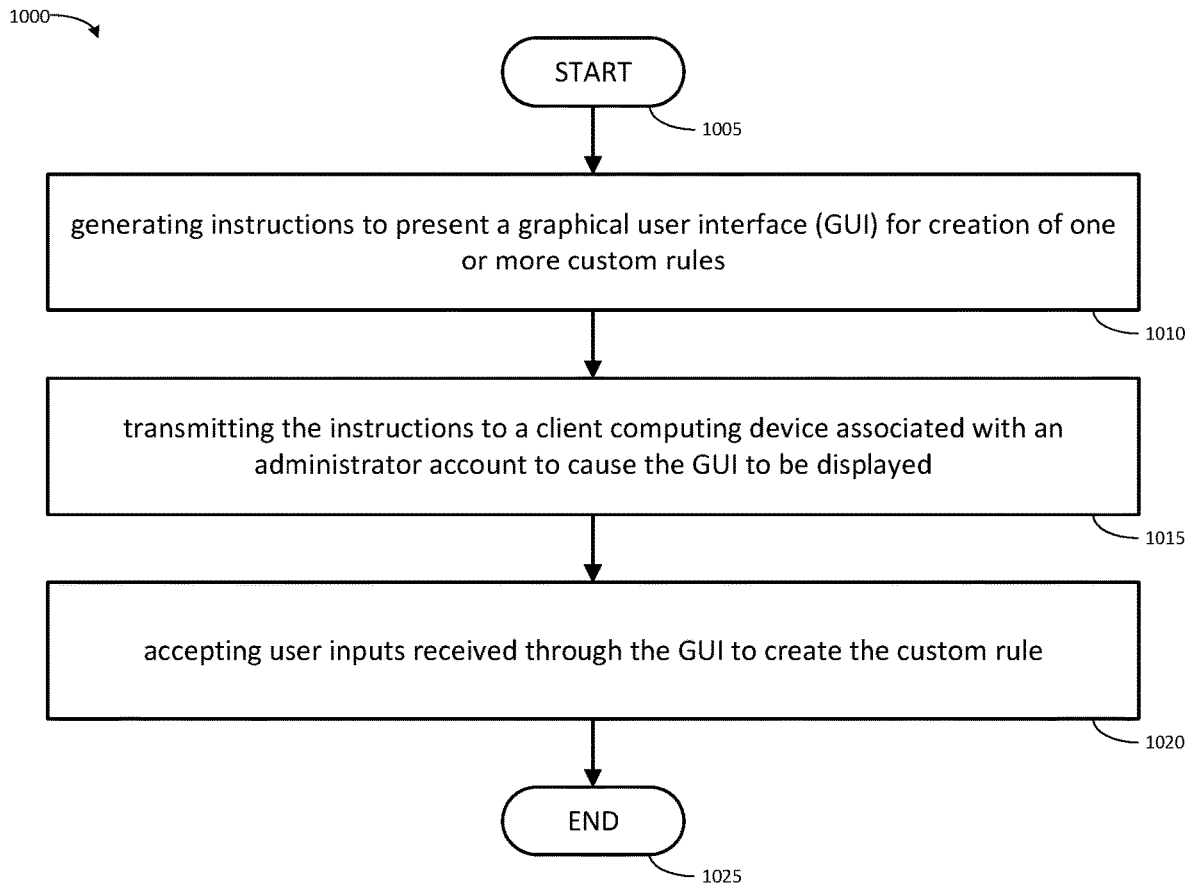
FIG. 10 illustrates one embodiment of a method associated with implementing custom validation and business logic (custom rule) scripting, and in particular, accepting user inputs to create the custom rules.

FIG. 10 illustrates one embodiment of a method 1000 associated with implementing custom validation and business logic (custom rule) scripting, and in particular, accepting user inputs to create the custom rules. In one embodiment, the steps of method 1000 are performed by mobile application server instance 215, and more particularly mobile application composer 220 (as shown and described with reference to FIG. 2 and other figures herein). In one embodiment, mobile application server instance 215 is implemented by mobile application server system 105. In one embodiment, mobile application server system 105 is a special purpose computing device or collection of special purpose computing devices (such as computing device 1505) configured with custom rule scripting logic 1530.

The method 1000 may be initiated based on various triggers, such as receiving a signal over a network or parsing stored data indicating that rule/script editor client 180 has accessed the custom rule. The method 1000 initiates at START block 1005 in response to parsing a signal received or stored data retrieved and determining that the signal or stored data indicates that the method 1000 should begin. Processing continues to process block 1010.

At process block 1010, the processor generates instructions to present a graphical user interface (GUI) for creation of one or more custom rules. In one embodiment, the processor generates one or more instructions for generating a web page that includes an instance of rule/script editor client 180. Note that the generation of instructions to support rule/script editor client 180 may be a substantially continuous process while the user interacts with the rule/script editor client 180 to cause changes both the rule/script editor client 180 and to custom rules. Processing at process block 1010 then completes, and processing continues to process block 1015.

At process block 1015, the processor transmits the instructions to a client computing device associated with an administrator account to cause the GUI to be displayed. In one embodiment, the processor receives a request from client computing device 115 for the mobile application composer 220. In response the processor transmits the instructions to present the rule/script editor 405 graphical user interface for the rule/script editor client 180 to the client computing device 115. This causes client computing device 115 to display the rule/script editor client 180. Processing at process block 1015 then completes, and processing continues to process block 1020.

At process block 1020, the processor accepts user inputs received through the GUI to create the custom rule. A user may manipulate custom rules using tools presented as part of rule/script editor client 180 and its associated GUI. The mobile application composer 220 accepts them and persists them in mobile repository 225. This process may continue to repeat continuously while a user is using rule/script editor client 180 to interact with mobile application composer 220. Processing at process block 1020 then completes, and processing continues to END block 1025, where process 1000 ends.

As discussed above, mobile application composer 220 includes a script editor 405. In one embodiment, script editor 405 can be accessed through rule/script editor client 180 operating on client computing device 115. In one embodiment, an administrator or authorized user of the mobile application system will log in to the mobile application composer 220, select a sandbox to work in, and navigate to a mobile application setup menu. The In one embodiment, the steps of method 10 may be performed at least in part by rule/script editor 405. In one embodiment, the script editor 405 is a free-form text editor for creating or modifying interpreted programming language scripts, such as JavaScript scripts. In one embodiment, the script editor 405 may be a visual editor allowing drag-and-drop assembly of interpreted programming language.

In one embodiment, the script editor 405 includes an option for enabling or disabling client-side script execution. When the client-side script execution is enabled, the script for the custom rule, and if needed, supporting data for the custom rule will be transmitted to the mobile application client for local storage, for example by configuration service 230. This client-side-enabled custom rule will continue to be applied (enforced) without delay even while the mobile application client is operating offline mode. When the client-side script execution is disabled, neither the script for the custom rule nor the supporting data for the custom rule will be transmitted to the mobile application client for local storage. This client-side-disabled custom rule will not continue to be applied while the mobile application client is operating offline mode, and will not be enforced until synchronization after offline mode operation ends and connectivity is restored.

Figure 11:
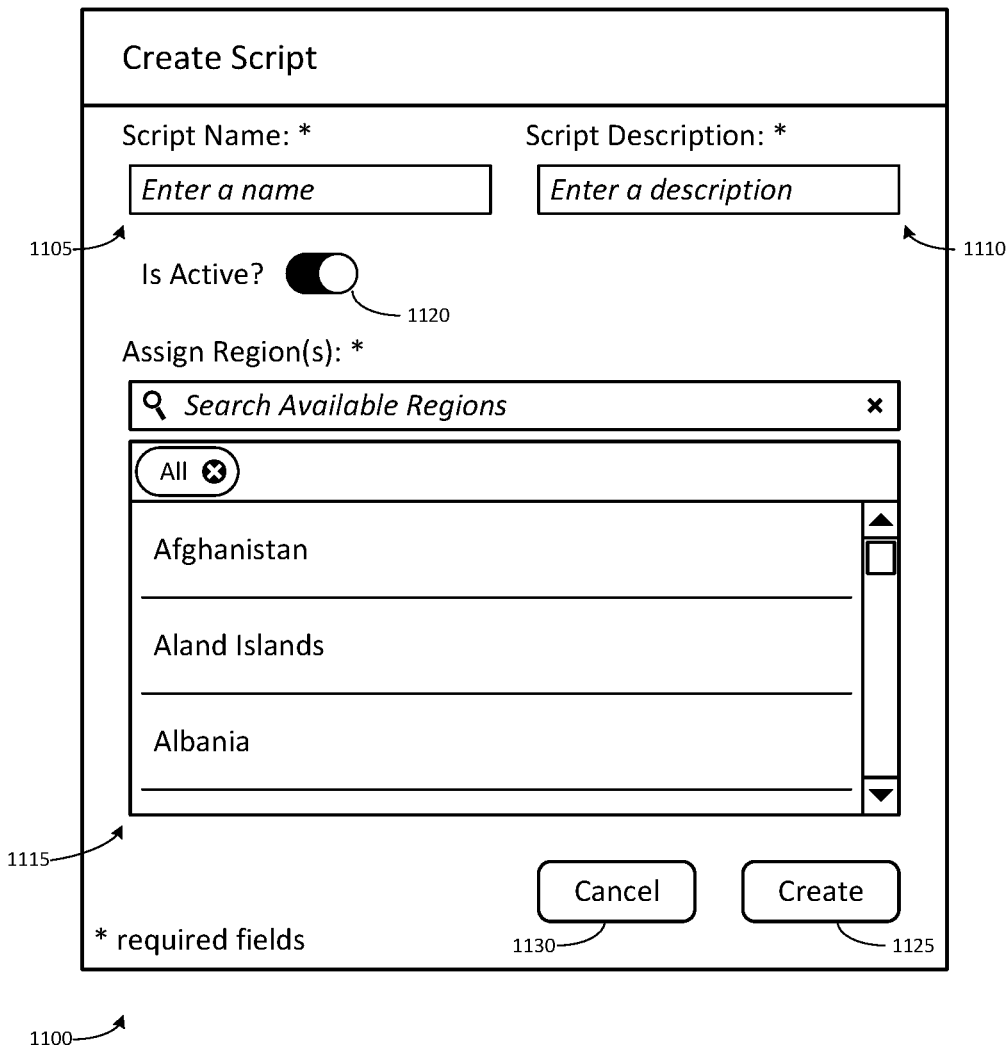
FIG. 11 illustrates one example embodiment of a "create script" dialog for creating a new custom rule script with script editor.

In one embodiment, script editor 405 may be operated using a GUI. FIG. 11 illustrates one example embodiment of a "create script" dialog 1100 for creating a new custom rule script with script editor 405. The user is presented with three required fields used to define the new script: a script name field 1105, a script description field 1110, and a region assignment search and selection field 1115. Note that the default state for the region field 1115 is "all," indicating that the script will operate in all geographical regions. But, it may be desirable to have the script work only in certain geographical regions. Accordingly, the user can select geographical regions for the script. The script will then work only for users who have the regions selected in region field 1115 as their country preference setting in, for example, their HR record.

The script may be set to an active or inactive state by graphical toggle 1120, where selecting the active state instructs the sandbox environment (or production environment) to execute the script when the script's triggering conditions are satisfied for objects associated with the script. Selecting the inactive state instructs the sandbox environment (or production environment) to ignore the script and not execute it, even when its triggering conditions are met. Thus, the active/inactive state controls which scripts are picked for execution at runtime. Selecting create button 1125 will allow the user to initialize the new script in the system and commence editing. Selecting cancel button 1130 will close the menu without creating the new script.

Figure 12:
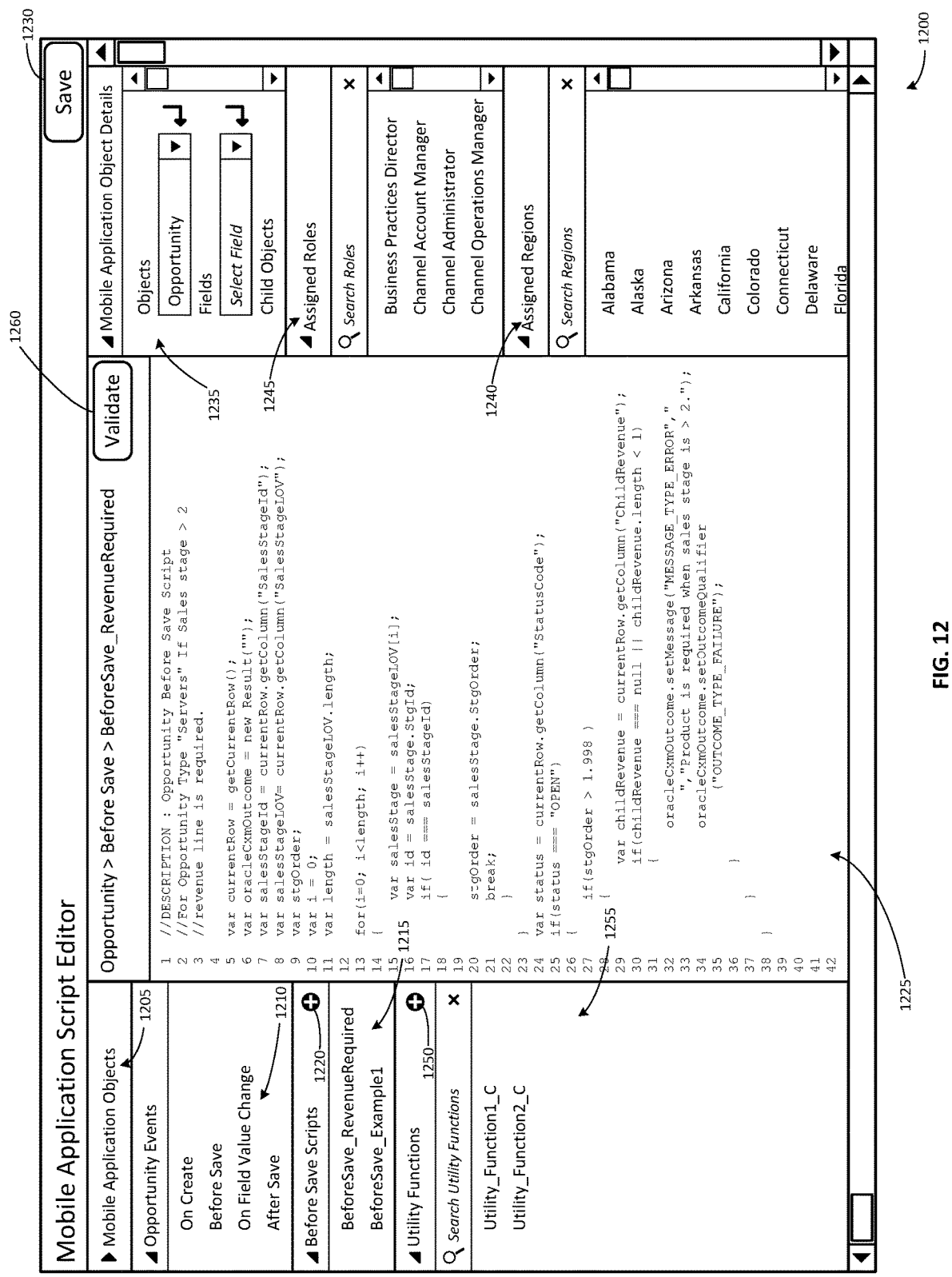
FIG. 12 illustrates one example embodiment of a mobile application script editor GUI.

FIG. 12 illustrates one example embodiment of a mobile application script editor GUI 1200. In one embodiment, the script editor GUI 1200 is an interface for operating rule/script editor 405 in application composed 220. In one embodiment, create script dialog 1100 can be reached from script editor GUI 1200. For example, by selecting an object in the (collapsed) mobile application objects menu 1205, and then select one of the triggering events 1210 that will trigger the script. The mobile application objects menu 1205 is a list of all available top-level objects in the mobile application system. In the view of script editor GUI 1200, an "opportunity" object has already been selected, causing menu 1205 to collapse and showing that for the opportunity object, the four events On Create (triggered when a new record is created in the mobile app), Before Save (triggered before a record is saved), On Field Value Change (triggered when a user changes the value of a field and then taps out of the field), and After Save (triggered after the app has saved the record) may be selected as triggering events for the opportunity object. In one embodiment, these four events are supported for scripts for any object in the mobile application system. Thus, the administrator or authorized user is able to select an object and see user interface events associated with an object in order to author scripts. This visibility is enabled for all standard, custom, and vertical objects in the mobile application system. Selecting one of the four events, for example, the before save event causes the before save scripts menu 1215 to be opened. Selecting the plus "+" button 1220 in the before save scripts menu 1215 will cause create script dialog 1100 to be opened. Note that there is a scripts menu for each type of triggering event. In one embodiment, the scripts menu lists all scripts associated with a given object-event combination.

Once a new script has been initialized or created as described above with respect to FIG. 11, an administrator or authorized user is able to write and edit the new script in editing region 1225. Editing region 1225 is a free-form text editor. Changes made in editing region (or script box) 1225 are persisted in storage, for example in mobile repository 225, in response to user inputs indicating selection of save button 1230. Sub-features of objects, such as fields and child objects can be selected using mobile application object details menu 1235. Regions other than the regions selected in region field 1115 in FIG. 11 (including sub-regions) may be assigned using assigned regions menu 1240. Restricting custom rule scripts by user roles, rather than by region, requires that the restriction be written with a JavaScript script. The roles are searchable in an assigned roles menu 1245 in order to assist script writing.

In one embodiment, a user may create a custom function (also known as a utility function) that is available for all objects in all scripts. To begin creating a utility function, the user may select the plus "+" button 1250 in the utility functions menu 1255. The utility function may be drafted and edited in editing region 1225, as with other scripts above. Include the characters "_C" in the function name for the utility function, so that the function is designated as a utility function, and is included in the system functions list (discussed in further detail below). Once the utility function is included in the system functions list, the utility function can be accessed from any custom script. An example of the format of a utility function follows:

```
function example_c() {
    var a = 100;
    a = 100+a;
}
```

In one embodiment, in order to assist with selection of the correct object and field values, a user may type "Control+Space" (or other combination of keys) in the editing region 1225, and in response, a list of available objects and fields will be displayed. An object or field displayed in the list may be selected, for example by mouse click, and the correct value is inserted into the script text in the editing region at the cursor location where "Control+Space" was typed. Further, this feature enables the use of system function that automatically populate application programming interfaces (APIs) into your script. By typing "Control+Space" and scrolling down to a "System Functions" section of the list, a user will reveal not only system functions created by the user, but also a list of APIs that the user may select from and insert into the script. The user can use these APIs to determine the host device's operating system, the current geographic location of the device (for example, by global positioning system (GPS)). In one embodiment, these APIs include, but are not limited to the system 'helper' functions and JavaScript wrapper APIs described above with reference to Table 2.

In one embodiment, the user may select the validate button 1260 to initiate a script validation process. In one embodiment, the processor parses the script composed in the editing region 1225 to perform a JavaScript syntax check. A successful syntax check indicates that the script will execute (although the executed script may not perform as expected due to non-syntax errors in the script). A failed syntax check indicates that the syntax of the script needs correction. The processor may provide visual prompts indicating likely syntax errors. Further, in response to the selection of the validate button, the processor may further parse the script composed in the editing region 1225 to perform a best practices check.

In one embodiment, the processor applies standard ESLint Validation Rules (available at https://eslint.org/docs/2.0.0/rules/) while performing these validation checks. In one embodiment, some few ESLint rules and/or best practices are disabled or enabled with reduced severity to improve usability of the rule/script editor 405. For example, the following rules and best practices are changed as described: no-irregular-whitespace—disallow irregular whitespace outside of strings and comments; no-multi-spaces—disallow use of multiple spaces; no-space-before-semi—disallow space before semicolon; no-trailingspaces—disallow trailing whitespace at the end of lines; comma-spacing—enforce spacing before and after comma; eol-last—enforce newline at the end of file, with no multiple empty lines; global-strict—require or disallow the "use strict" pragma in the global scope.

In one embodiment, the processor further performs a validation check for blacklisted APIs or global objects. These APIs are disallowed from usage in custom rule scripts, in some cases because they present a security risk to the mobile application system. In one embodiment, the following APIs and global objects are blacklisted: Console; Alert; Window; Document; System; Promise; XMLHttpRequest; XHR.

These objects may be rejected or removed by a processor conducting a validation check. Similarly, trusted APIs may be whitelisted.

Thus, using a GUI interface to rule/script editor 405, an administrator or authorized user of the mobile application system can configure the mobile application system to match business requirements by writing custom JavaScript scripts that enforce validations and rules during both online and offline. Custom rule scripts may be applied to any top-level object in the mobile application system. Custom rule scripts may be created generally for all objects or groups of objects, or even for a specific object. The custom rule scripts may be configured to trigger on an event selected by the user. For example, a user can create a script that makes the product field mandatory when a new 'opportunity' object is created in the mobile application system.

—Example Client GUIs—

FIG. 13 illustrates an example client GUI 1300 for a mobile application client instance 170 associated with implementing custom validation and business logic (custom rule) scripting during offline-mode operations. Mobile application client instance 170 is operating in offline mode. This is confirmed by cellular signal indicator 1305 and WI-FI signal indicator 1310, each of which indicate no signal, and therefore no network connectivity between the mobile application client instance 170 and mobile application server system 105.

The mobile application client instance 170 that is generating GUI 1300 is configured in accordance with the systems and methods described herein to locally execute custom rule scripts. For example, this mobile application client instance 170 is configured to execute a custom rule script OnFieldValueChange to the sales stage for an opportunity object. The custom rule script requires that a value be entered in the revenue amount field in order to advance the sales stage beyond opportunity (stage 2) 1315 to building vision (stage 3) 1320. Without the inventive systems and methods discussed herein, the mobile application client instance 170 would not be able to enforce the "revenue field required" validation rule. But, because the application client instance 170 is configured in accordance with the systems and methods described herein (referring to inset 1330) selection of the building vision button 1335 to change the sales stage field value to 3 while no revenue amount has been entered results in enforcement of the validation rule, and a rejection of the change, as shown in inset 1340.

Figure 14:
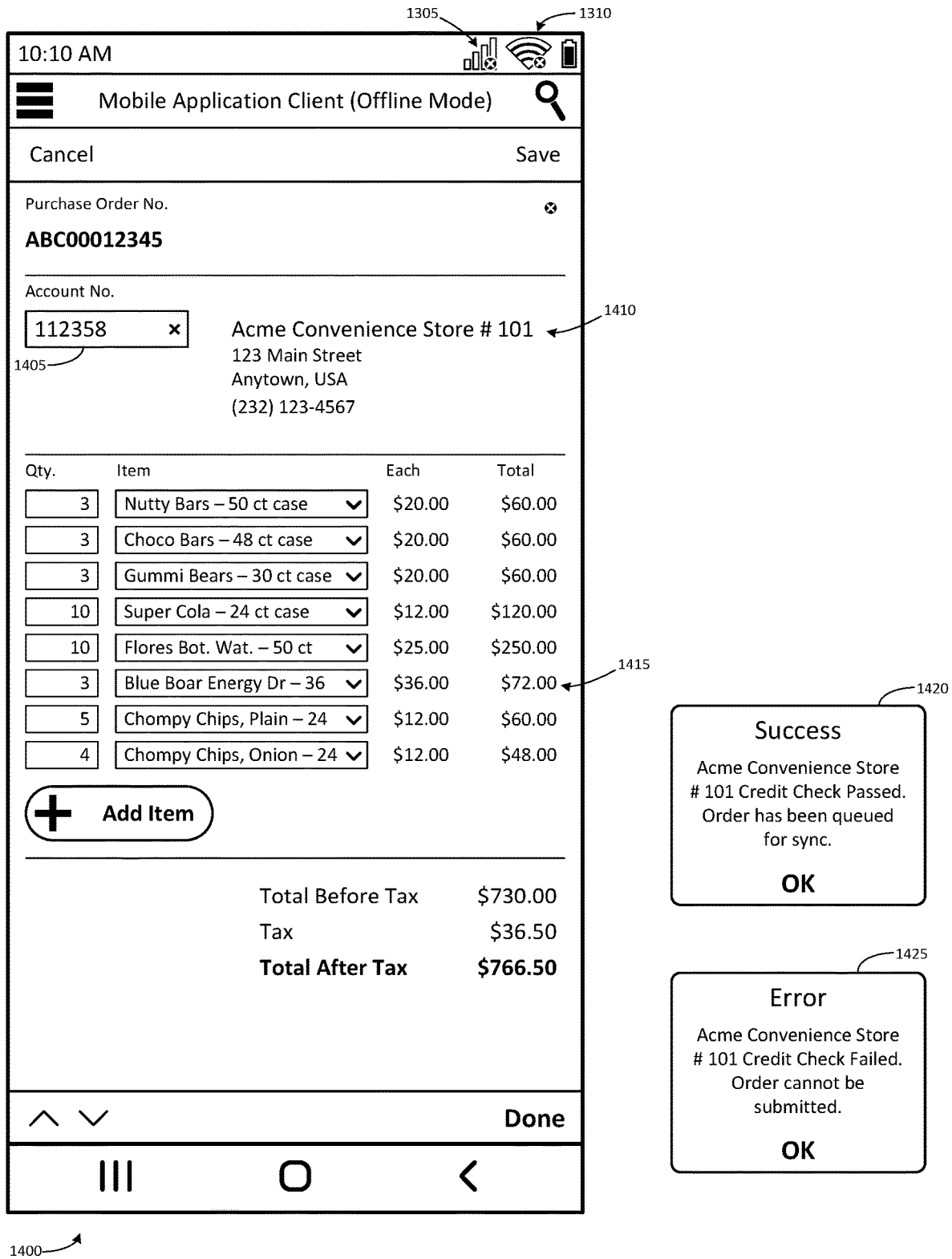
FIG. 14 illustrates an example client GUI for a mobile application client instance associated with implementing custom validation and business logic (custom rule) scripting during offline-mode operations.

FIG. 14 illustrates an example client GUI 1400 for a mobile application client instance 170 associated with implementing custom validation and business logic (custom rule) scripting during offline-mode operations. Mobile application client instance 170 is operating in offline mode. As above, this is confirmed by cellular signal indicator 1305 and WI-FI signal indicator 1310, each of which indicate no signal, and therefore no network connectivity between the mobile application client instance 170 and mobile application server system 105.

The mobile application client instance 170 that is generating GUI 1400 is configured in accordance with the systems and methods described herein to locally execute custom rule scripts. For example, this mobile application client instance 170 is configured to execute several custom rule scripts for a purchase order object.

In a first example, this mobile application client instance is configured to execute a custom rule script on OnFieldValueChange. When Account no. 1405 is entered in the field, the custom rule script is configured to lookup and retrieve the address information 1410 for the account. Note that this data is supporting data for the account address lookup that is pre-loaded into the mobile application client instance 170 due to the fact that the custom rule script was configured to run queries against it. Note that this query could be completed immediately, without delay for access to a remote server.

In a second example, at purchase order row 1415, Blue Boar Energy drink is being sold subject to a buy 2, get a third free sales promotion. The mobile application client instance 170 is configured with both a custom rule script (executing OnFieldValueChange to Blue Boar in the item field) to reduce the price according to the rule. The time range of this promotion is brief, and would not justify customization and re-building of the core application. But, due to the advantages offered by the systems and methods described herein for offline-mode customization, deployment of custom logic for a simple sales promotion is justified.

In a third example, as shown at success message inset 1420 and error 1425, this mobile application client instance is configured to execute a custom rule script on BeforeSave, that runs a credit check when the total is in excess of 700 dollars. The credit information on customers is supporting data that is pre-populated along with the custom script.

—Further Example Use Cases—

In one embodiment, a set of custom rules is applied to an opportunity object. At initial creation of the object (on create) by a mobile application client operating in offline mode, the mobile application client can immediately (1) enforce a requirement that an "account" field be filled (account is a required field); (2) set default values for custom fields—a chance to win assigned a list of values "low," "medium," and "high," and an opportunity type assigned a list of values "transportation," "contract logistics," and "global projects;" (3) enforce a requirement that once an opportunity is created with a certain opportunity type, it cannot be changed—on other words, make opportunity type "read-only." When a field value is changed (on field value change) by a mobile application client operating in offline mode, the mobile application client can immediately enforce conditional field requirements based on opportunity type—there can be multiple layouts based on opportunity type. For example, where the opportunity type is transportation, the required fields include an operations start date field. In another example, where the opportunity type is contract logistics, the required fields are: (a) a "business type" field indicating a nature of the opportunity with a list of values "new," "growth," and "retention;" (b) a "site" field describing the general location of an opportunity with list of values "APAC" (Asia-Pacific), "EMEA" (Europe, Middle East, and Africa), "NA" (North America), "LATAM" (Latin America); (c) a "region" field further subdividing the locations of the site field, with a list of values dependent on the selected value of the site field—for example, the list of values may be the list of countries within the site; (d) a "vertical market" field; and (e) a "tender receipt date" field. Before saving changes to the object (before save) by a mobile application client operating in offline mode, the mobile application client can immediately enforce a requirement for transportation opportunities (opportunity type=transportation) that if the sales stage is greater than 2, the revenue field is required. The mobile application client will prohibit the save operation (and present an error message) if any of these requirements fail. This holds true even though the mobile application client is operating in offline mode, where the changes are not immediately being submitted to the mobile application server, and are instead queued for later synchronization.

In one embodiment, another set of custom rules is applied to an opportunity object. At initial creation of the object (on create) by a mobile application client operating in offline mode, the mobile application client can immediately make an account field mandatory, and the mobile client may present an error message in response to an attempt to edit any other field before an account value is provided. When a field value for opportunity stage is changed (on field value change) by a mobile application client operating in offline mode, the mobile application client can immediately enforce a requirement (1) to make a "competitor" field mandatory when the opportunity stage is greater than 2, and (2) to make a "partner" field mandatory when the opportunity stage is greater than 3.

In one embodiment, a custom rule is applied to a "contact" object. At initial creation of the object (on create) by a mobile application client operating in offline mode, the mobile application client can immediately require that an account field is mandatory, and the mobile client may present an error message in response to an attempt to edit any other field before an account value is provided.

In another embodiment, a custom rule is applied to a "contact" object. When an account field value is set for the contact (on field value change) in a mobile application client operating in offline mode, the mobile application client can immediately set default address fields of the contact to the same values as the address fields of the account selected for the contact.

In another embodiment, a custom rule is applied to a "lead" (that is, a sales lead) object. After saving changes to the lead object (after save) by a mobile application client operating in offline mode, the mobile application client can immediately create a task and associate the task with both the lead and the user who "owns" the lead (for example, the user who created the lead).

In one embodiment, one or more custom rules for consumer goods configurations of the mobile application client may be applied. For example, custom business logic and custom validation expressions may be applied to cart and purchase operations. For example, a mobile application client operating in offline mode can: (1) only allow orders to be taken if account credit status is or is not a certain value, or if the value of some custom field X is >0, or otherwise place restrictions on order acceptance; (2) only allow shopping cart or order submission if the value of some account custom field Y=True OR the value of some custom field X is >the value of the order; (3) prevent capture of a returned order by the mobile application client if the returned products are not eligible for return—eligibility for return can be defined by custom fields; (4) prevent use of a credit line as a payment type, if the credit line is expired—expiration may be a customer defined custom field on a credit line object; (5) enforce a maximum amount per payment type when payment is created—payment type is a list of values (check, cash, credit, etc.) on a payment object; (6) permit cash payment only if an account is eligible for it—payment object is related to account object; (7) if cart total amount exceeds X amount, automatically apply Y % discount; (8) prevent submission of shopping cart unless a purchase order (PO) number—a customer defined custom field—is populated by a sales representative user of the mobile application client; (9) enforce contract guardrails to restrict negotiation within an allowable range, for example, prevent saving of a contact unless a share of shelf is not within a range of 20%-100%.

Further custom rules for consumer goods configurations of the mobile application client may be applied, such as custom validation rules that account for varied pricing rules, enabling pricing on items to change within an order if different growth tiers or loyalty levels are achieved based on the order contents. For example, the mobile application client may identify a conditional promotions in offline mode without connection to the mobile application server, such as where at least 50 items X are added to a cart (or purchase order) at list price, automatically add Z quantity of Y items to the cart for zero price. Promotions of this type could be along the lines of "get a free item C if you add 2 items from Group A and 1 item from Group B." Thus, if a sales representative using the mobile application client adds at least 2 items from A and 1 item from B, the item C will be automatically added to the order (even if the mobile application client is operating in offline mode). If those items are removed, item C would be removed automatically.

Additionally, custom rules for consumer goods configurations of the mobile application client may be applied to further automate shopping cart operations. For example, a mobile application client operating in offline mode can enforce a maximum number of promotions that can be added or applied to one cart. In another example, a mobile application client operating in offline mode can automatically add any items to a list of out of stock items where a current inventory amount is less than a recommended inventory amount (whether this amount is stored as a value on the account product assortment or stored as a custom attribute on some custom object) and possibly remove them from the cart.

Additionally, custom rules for consumer goods configurations of the mobile application client may be applied for a variety of other validation purposes. For example, a mobile application client operating in offline mode can: (1) disallow a call to Check Out unless tasks marked required are complete or rescheduled; or (2) specify products or line of products which are permitted to be paid for using a given payment type.

The example use cases above further illustrate the great flexibility offered by the implementation of custom validation and business logic (custom rule) scripting for a mobile application disclosed herein. Due to the systems and methods described herein, each of these custom rules can be applied immediately even while the mobile application client is operating in offline mode—that is, the custom rules can be enforced without delaying until the mobile application client is back online and synchronizing with the mobile application server. Further, the custom rules are not subject to failure if implemented with REST architecture, and thus enable the application to immediately enforce custom rules even while operating in an online mode that uses REST communication with the mobile application server. Moreover, the logic for each of these use cases is completely separate from the core mobile application client functionality, allowing rapid manipulation, deployment, removal, and other management of the custom rules without requiring complex modifications to the mobile application client and/or server for minor (or indeed, major) business logic or validation customizations. For example, the core mobile application need not be modified in order to implement a temporary regional sales promotion. Thus, the systems and methods described herein significantly improve both offline mode operation and online mode operation of mobile application clients.

—Example Scripts—

For non-limiting, illustrative purposes, a few selected example custom rule scripts are presented here. In one example, a custom rule script is applied to an opportunity object and is triggered by the occurrence of an "OnCreate" scripting event. The script implements three custom rules: (1) Account is required; (2) Set default values for fields (custom fields), (a) Chance to win=Medium, Values to choose from: Low, Medium, and High, (b) OpportunityType=Servers, Values to choose from: Servers, Laptops, and Software, and (3) Custom field ContractStartDate is mandatory.

Example Script 1:

```
// On Create Script to set required and default fields
// DESCRIPTION : Oppty OnCreate Script
// Features
// 1. Account is required
// 2. Set default values for fields(custom fields)
// 2.1. Chance to win = Medium
// 2.2. Opty type = Servers
var currentRow = getCurrentRow();
var oracleCxmOutcome = new Result ("");
var optyDetail = currentRow.getResourceName(); //OpportunityDetail
var key = optyDetail + "___TargetPartyName___mandatory";
oracleCxmOutcome.setModifiedProperty(key,"true");
//Setting of default values for Opty Type and chance to win
currentRow.setColumn("OpportunityType_c","ZEM_TYPE_SERVERS");
currentRow.setColumn("ChanceToWin_c","ZEM_TYPE_MEDIUM");
currentRow.setColumn("StatusCode","OPEN") ;
key = optyDetail + "___ContractStartDate_c___mandatory";
oracleCxmOutcome.setModifiedProperty(key,"true");
```

In one example, a custom rule script is applied to an opportunity object and is triggered by the occurrence of a "BeforeSave" scripting event. The script implements a custom rule that, if Status is Open and Sales Stage>2, then revenue line is required.

Example Script 2:

```
//DESCRIPTION : Opportunity Before Save Script
//For Opportunity Type "Servers" If Sales stage > 2
//revenue line is required.
var currentRow = getCurrentRow();
var oracleCxmOutcome = new Result("");
var salesStageId = currentRow.getColumn("SalesStageId");
var salesStageLOV= currentRow.getColumn("SalesStageLOV")
var stgOrder;
var i = 0;
var length = salesStageLOV.length;
for(i=0; i<length; i++)
{
  var salesStage = salesStageLOV[i];
  var id = salesStage.StgId;
  if( id === salesStageId)
  {
  stgOrder = salesStage.StgOrder;
  break;
  }
}
var status = currentRow. getColumn("StatusCode") ;
if (status === "OPEN")
{
  if(stgOrder > 1.998 )
  {
     var childRevenue = currentRow.getColumn ("ChildRevenue");
     if (childRevenue === null || childRevenue.length < 1)
     {
    oracleCxmOutcome.setMessage ( "MESSAGE_TYPE_ERROR", "", "Product is required when sales stage is > 2.");
    oracleCxmOutcome.setOutcomeQualifier("OUTCOME_TYPE_FAILURE");
     }
  }
}
```

In one example, a custom rule script is applied to an opportunity object and is triggered by the occurrence of a "AfterSave" scripting event. The script implements a custom rule that, creates a task, assigns it to signed-in user, and associates it to the newly created opportunity.

Example Script 3:

```
//Create Task for Opportunity
var opptiRow = getCurrentRow();
var TaskRow = createNewRow(false, "Task", "");
var userPref = getUserPreferences();
var userName = userPref.getUserName();
TaskRow.setColumn('ActivityCreatedBy', userName);
TaskRow.setColumn('Subject',"Follow up Task for Oppty : "+opptiRow.getColumn("Name"));
var OpportunityId = opptiRow.getColumn("OptyId");
TaskRow.setColumn('OpportunityId',OpportunityId);
var oracleCxmOutcome = new Result("");
oracleCxmOutcome.setModifiedObject (TaskRow);
```

In one example, a custom rule script is applied to a contracts object and is triggered by the occurrence of an "OnCreate" scripting event. The script implements a custom rule that makes account a mandatory field.

Example Script 4:

```
var contactRow = getCurrentRow();
var oracleCxmOutcome = new Result("");
var s1 = contactRow.getResourceName(); //ContactDetail
var key = s1+ "___AccountName___mandatory";
oracleCxmOutcome.setModifiedProperty (key, "true");
```

In one example, a custom rule script is applied to a contracts object and is triggered by the occurrence of an "OnFieldValueChange" scripting event. The script implements a custom rule that copies an Account address to a Contact address.

Example Script 4:

```
var contactRow = getCurrentRow();
var accountPartyId = contactRow.getColumn('AccountPartyId');
var oracleCxmOutcome = new Result ("") ;
if (accountPartyId != null) {
    // Query the associated Account to retrieve Primary Address stored in that account record
    var q = query("Organization");
    q.setParameters('PartyId',accountPartyId);
    var accountPo = q.execute();
    var addressList = accountPo[0].getColumn('PrimaryAddress');
    var addressPo = addressList.get(0);
    var addressLine1 = addressPo.get("AddressLine1");
    var addressLine2 = addressPo.get("AddressLine2");
    var cityName = addressPo.get('City');
    var stateName = addressPo.get('State');
    var postalCodeNumber = addressPo.get ('PostalCode') ;
    var countryName = addressPo.get('Country');
    // Assign the retrieved Primary Address to Contact address fields
    var paRows = contactRow.getColumn("PrimaryAddress");
    if(paRows==null) {
    paRows = getEmptyChildCollection();
    }
    var pa = createNewRow(true, "Person", "PrimaryAddress");
    pa.setColumn('AddressLine1', addressLine1) ;
    pa.setColumn('AddressLine2', addressLine2) ;
    pa.setColumn('City', cityName );
    pa.setColumn ('State', stateName );
    pa.setColumn ('PostalCode', postalCodeNumber );
    pa.setColumn ('Country', countryName );
    paRows.set(0,pa.po);
    contactRow.setColumn("PrimaryAddress",paRows);
    oracleCxmOutcome.setModifiedObject(contactRow);
}
```

—Selected Advantages—

The performance of the mobile application system itself is improved in several ways by the systems and methods described herein: (i) mobile application clients can operate with all custom features enabled even when a network connection to the mobile application server is unavailable; (ii) enforcement of a custom rule is immediate, rather than delayed; (iii) invalid data is prevented from entering the mobile application database server by enforcing custom rules as the data is entered, (iv) server-side data processing on synchronization after network connectivity is restored is far more efficient because the custom rules are already applied on the client side, and need not be performed on the server side during sync operations. One significant cause of these technical improvements is the advantageous immediate enforcement of custom rules enabled by the inventive relocation of the custom rule operation from execution on the server side to, unconventionally, execution on the client side (for example, in scripting engine 250). These technical improvements may further be caused by the unconventional copying of supporting data for the custom rule (for all potential custom rule operations) from the sever side to local storage on the client side.

Note that features of a mobile application client's graphical user interface which would necessarily be disabled during offline operation (for example, the automatic display of discounted pricing due to custom incentives) are fully enabled in offline operation due to the implementation of the systems and methods described herein.

The mobile application system is further improved by eliminating the need for re-building the client application in response to each new custom rule. Instead, the custom rules are executed agnostically by a mobile application client. This is enabled by the inventive and unconventional configuration of a mobile application client with a general rule execution environment. Thus, the mobile application client can implement custom functionality without requiring customization of the mobile application client itself. Further, mobile application client instances configured for different roles and/or different locations are enabled to have distinct custom functionality while still executing the same build or version of the mobile application client.

The invention allows users to use the application in offline or online mode seamlessly, with the same set of validation enforced regardless of their network connectivity thereby letting the user use the app in the most effective way. Ensuring that the data is validated regardless of online or offline mode also ensures that data meets contractual requirements, ensures good quality data in the system which ensures better results with business intelligence and artificial intelligence analyses. Having custom business logic working in a mobile app allows users to perform all aspects of their work from the mobile device. Having instant validation instead of delayed validation that occurs later in an asynchronous mode provides users with a vastly improved user experience.

Advantageously, the hardware used to implement the mobile system need not be changed in order to obtain these benefits. Note, then, that it is not the application of computing hardware that causes the improvements, but the inventive operation of systems and methods described herein.

—Software Module, CRM, Cloud, and Enterprise Embodiments—

In general, software instructions are designed to be executed by a suitably programmed processor. These software instructions may include, for example, computer-executable code and source code that may be compiled into computer-executable code. These software instructions may also include instructions written in an interpreted programming language, such as a scripting language.

In a complex system, such instructions are typically arranged into program modules with each such module performing a specific task, process, function, or operation. The entire set of modules may be controlled or coordinated in their operation by an operating system (OS) or other form of organizational platform.

In one embodiment, one or more of the components, functions, methods, or processes described herein are configured as modules stored in a non-transitory computer readable medium. The modules are configured with stored software instructions that when executed by at least a processor accessing memory or storage cause the computing device to perform the corresponding function(s) as described herein. Non-transitory computer-readable media expressly exclude transitory propagating signals.

In one embodiment, the mobile application server system 105 is a computing/data processing system including an application or collection of distributed applications for enterprise organizations. The applications and mobile application server system 105 may be configured to operate with or be implemented as a cloud-based networking system, a software as a service (SaaS) architecture, or other type of networked computing solution. In one embodiment the mobile application server system 105 is a centralized server-side application that provides at least the functions disclosed herein and that is accessed by many users by operation of computing devices/terminals communicating with mobile application server system 105 (functioning as the server) over a computer network.

—Computing Device Embodiment—

Figure 15:
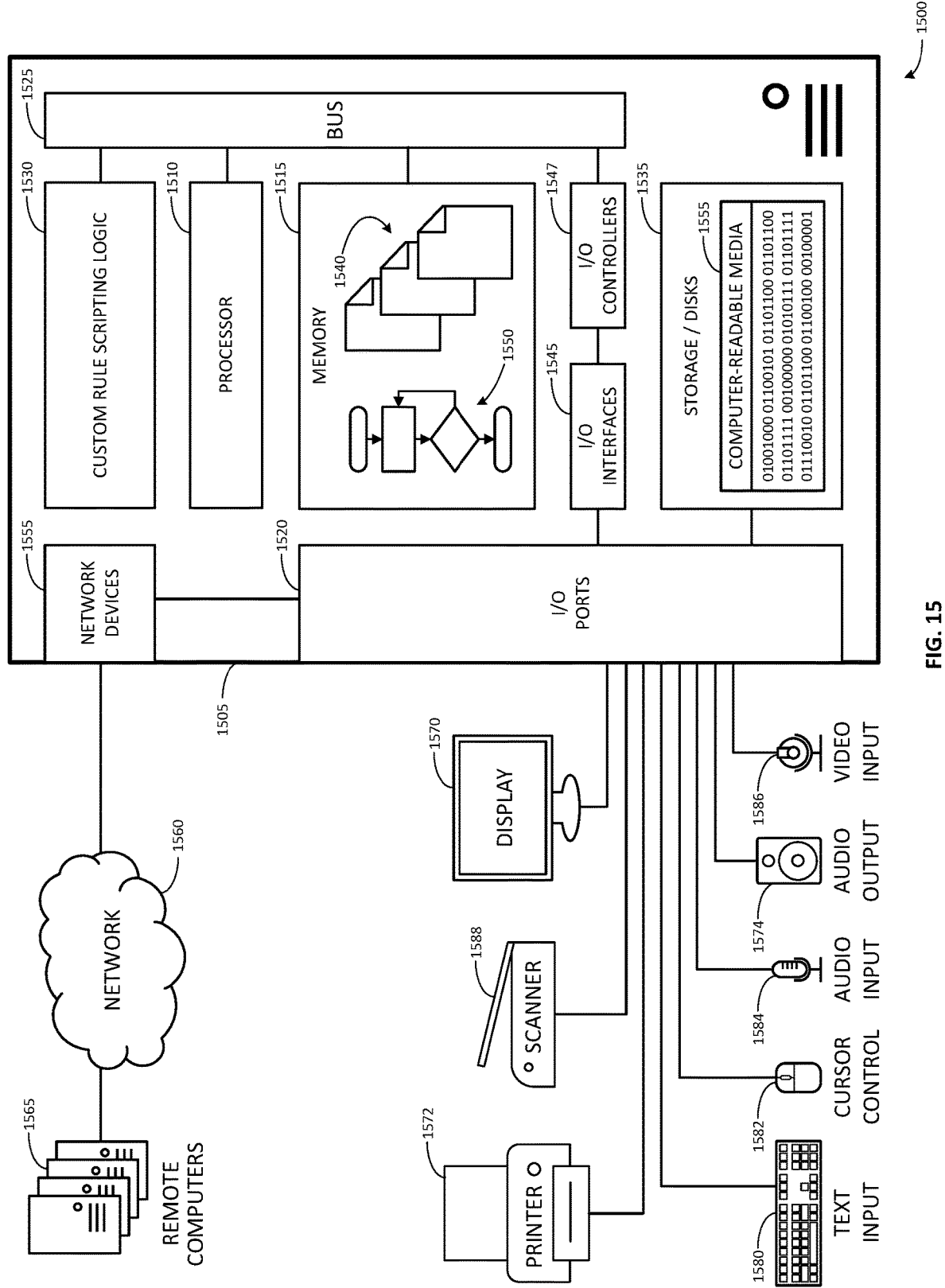
FIG. 15 illustrates an example computing device that is configured and/or programmed with one or more of the example systems and methods described herein, and/or equivalents.

FIG. 15 illustrates an example computing device that is configured and/or programmed with one or more of the example systems and methods described herein, and/or equivalents. The example computing device may be a computer 1500 that includes a processor 1510, a memory 1515, and input/output ports 1520 operably connected by a bus 1525. In one example, the computer 1500 may include custom rule scripting logic 1530 configured to facilitate custom validation and business logic (custom rule) scripting for mobile application offline-mode operation similar to the logic, systems, and methods shown and described with reference to FIGS. 1-14. In different examples, the logic 1530 may be implemented in hardware, a non-transitory computer-readable medium with stored instructions, firmware, and/or combinations thereof. While the logic 1530 is illustrated as a hardware component attached to the bus 1525, it is to be appreciated that in other embodiments, the logic 1530 could be implemented in the processor 1510, stored in memory 1515, or stored in disk 1535.

In one embodiment, logic 1530 or the computer is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an ASIC programmed to implement custom validation and business logic (custom rule) scripting for mobile application offline-mode operation. The means may also be implemented as stored computer executable instructions that are presented to computer 1500 as data 1540 that are temporarily stored in memory 1515 and then executed by processor 1510.

Logic 1530 may also provide means (e.g., hardware, non-transitory computer-readable medium that stores executable instructions, firmware) for performing custom validation and business logic (custom rule) scripting for mobile application offline-mode operation.

Generally describing an example configuration of the computer 1500, the processor 1510 may be a variety of various processors including dual microprocessor and other multi-processor architectures. A memory 1515 may include volatile memory and/or non-volatile memory. Non-volatile memory may include, for example, ROM, PROM, and so on. Volatile memory may include, for example, RAM, SRAM, DRAM, and so on.

A storage disk 1535 may be operably connected to the computer 1500 via, for example, an input/output (I/O) interface (e.g., card, device) 1545 and an input/output port 1520. The disk 1535 may be, for example, a magnetic disk drive, a solid state disk drive, a floppy disk drive, a tape drive, a Zip drive, a flash memory card, a memory stick, and so on. Furthermore, the disk 1535 may be a CD-ROM drive, a CD-R drive, a CD-RW drive, a DVD ROM, and so on. The memory 1515 can store a process 1550 and/or a data 1540, for example. The disk 1535 and/or the memory 1515 can store an operating system that controls and allocates resources of the computer 1500.

The computer 1500 may interact with input/output (I/O) devices via the I/O interfaces 1545 and the input/output ports 1520. Input/output devices may be, for example, a keyboard, a microphone, a pointing and selection device, cameras, video cards, displays, the disk 1535, the network devices 1555, and so on. The input/output ports 1520 may include, for example, serial ports, parallel ports, and USB ports.

The computer 1500 can operate in a network environment and thus may be connected to the network devices 1555 via the I/O interfaces 1545, and/or the I/O ports 1520. Through the network devices 1555, the computer 1500 may interact with a network. Through the network, the computer 1500 may be logically connected to remote computers. Networks with which the computer 1500 may interact include, but are not limited to, a LAN, a WAN, and other networks.

—Mobile Device Embodiment—

Figure 16:
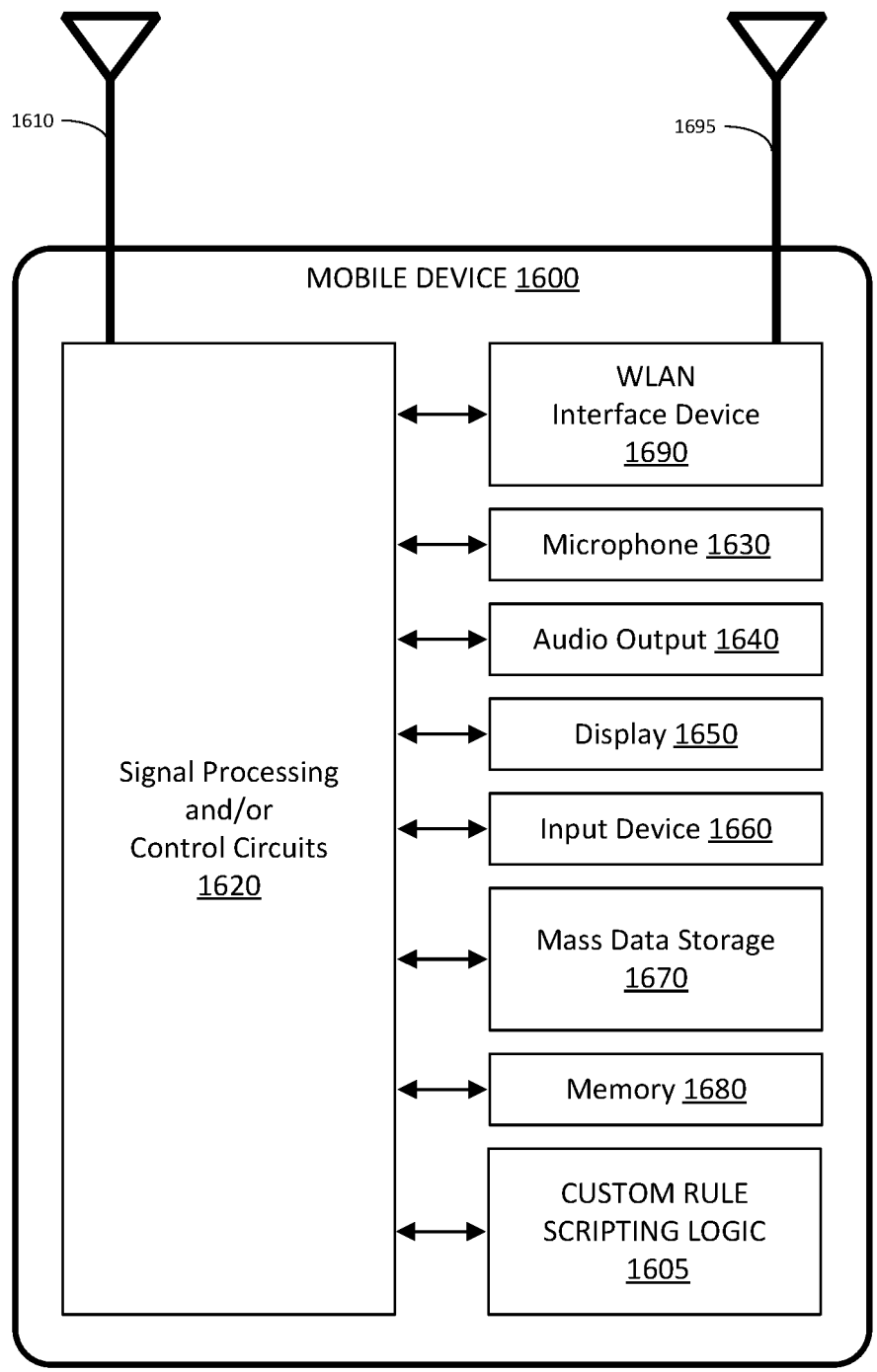
FIG. 16, illustrates an example mobile device that is configured and/or programmed with one or more of the example systems and methods described herein, and/or equivalents.

Referring now to FIG. 16, illustrates an example mobile device 1600 that is configured and/or programmed with one or more of the example systems and methods described herein, and/or equivalents. In one example, the mobile device 1600 may include custom rule scripting logic 1605 configured to facilitate data-provider-agnostic change handling in mobile client applications similar to the logic, system, and methods shown and described with reference to shown in FIGS. 1 through 14. Mobile device 1600 may include a cellular antenna 1610. The example embodiment may implement signal processing and/or control circuits, which are generally identified in FIG. 16 at 1620. In some implementations, the mobile device 1600 includes a microphone 1630, an audio output 1640 such as a speaker and/or audio output jack, a display 1650 and/or an input device 1660 such as a keypad, pointing device, voice actuation and/or other input devices. The signal processing and/or control circuits 1620 and/or other circuits (not shown) in the mobile device 1600 may process data, perform coding and/or encryption, perform calculations, format data and/or perform other cellular phone, tablet, or mobile device functions.

The mobile device 1600 may communicate with a mass data storage 1670 that stores data in a nonvolatile manner such as in magnetic, optical, and/or solid-state storage devices including, for example, HDDs, DVD, and or SSDs. The cellular phone 1600 may be connected to a memory 1680 such as RAM, ROM, low latency nonvolatile memory such as flash memory and/or other suitable electronic data storage. The mobile device 1600 also may support connections with a WLAN by way of a WLAN network interface 1690. Mobile device 1600 may include a WLAN antenna 1695. In one embodiment, the mobile device 1600 may communicate through the WLAN with cloud storage systems (for example data stores 135) that store data in a non-volatile manner. In one embodiment, example systems and methods may be implemented using the WLAN network interface 1690, but other arrangements are also possible.

Definitions and Other Embodiments

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

ASIC: application specific integrated circuit.
CD: compact disk.
CD-R: CD recordable.
CD-RW: CD rewriteable.
DVD: digital versatile disk and/or digital video disk.
HTTP: hypertext transfer protocol.
LAN: local area network.
RAM: random access memory.
DRAM: dynamic RAM.
SRAM: synchronous RAM.
ROM: read only memory.
PROM: programmable ROM.
EPROM: erasable PROM.
EEPROM: electrically erasable PROM.
RDBMS: relational database management system.
SSD: solid-state drive/solid-state storage device
SQL: structured query language.
USB: universal serial bus.
XML: extensible markup language.
WAN: wide area network.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. Data may function as instructions in some embodiments. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A computer-implemented method for enabling client-side enforcement of custom rules, the method comprising:
    creating on a mobile application server an interpreted programming language script that describes a custom rule for enforcement on a transaction performed on a mobile application client at a time the transaction is performed, wherein the mobile application client is configured to enforce the custom rule when operating in offline mode by executing the script with a script execution engine of the mobile application client;
    defining on the mobile application server defined characteristics of user accounts for which the mobile application client is to enforce the custom rule, wherein the defined characteristics describe at least one of (i) a geographic location for which the custom rule applies to transactions and (ii) a business role for which the custom rule applies to a duty or authority of the business role;
    in response to a connection being established between an instance of the mobile application client for a specific user account and the mobile application server,
        parsing by the mobile application server a record describing characteristics of the specific user account to identify a characteristic of the specific user account, wherein the characteristic of the specific user account is one of a geographic location or business role assigned to a user, and
        determining by the mobile application server that the instance of the mobile application client should enforce the custom rule based at least in part on a match between the characteristic of the specific user account and the defined characteristics; and
    in response to determining that the instance of the mobile application client should enforce the custom rule, transmitting the script from the mobile application server to the instance of the mobile application client to enable the instance to enforce the custom rule to validate data at the time of transaction performance when the instance of the mobile application client is operating in the offline mode.

2. The method of claim 1, further comprising:
placing the instance of the mobile application client into the offline mode in response to a detection of a lack of network connectivity to the mobile application server; and
while the instance of the mobile application client is operating in the offline mode:
    (i) accepting a user input to the instance of the mobile application client that triggers enforcement of the custom rule, and
    (ii) performing all functions of the custom rule locally by the instance of the mobile application client to immediately enforce the custom rule.

3. The method of claim 1, further comprising:
composing a query to retrieve server-side supporting data that is queried during enforcement of the custom rule from a server-side mobile application database;
executing the query on the server-side mobile application database to obtain the server-side supporting data; and
transmitting the server-side supporting data to the instance of the mobile application client to further enable the instance to enforce the custom rule on a client side when the instance is operating in the offline mode.

4. The method of claim 3, further comprising:
placing the instance of the mobile application client into the offline mode in response to a detection of a lack of network connectivity to the mobile application server; and
while the instance of the mobile application client is operating in the offline mode:
    (i) accepting a user input to the instance of the mobile application client that triggers enforcement of the custom rule, and (ii) retrieving a portion of the supporting data from local storage to enable the instance of the mobile application client to immediately enforce the custom rule.

5. The method of claim 1, further comprising:
determining that a database of rules including the custom rule is a version newer than a version of the database stored by the mobile application client;
selecting the custom rule from among other rules of the database based on the match between the characteristics of the specific user account and the defined characteristics;
determining that the custom rule in the database of the rules is newer than a version of the custom rule stored by the mobile application client; and
updating the custom rule; wherein another custom rule that has other characteristics that do not match the characteristics of the specific user account is not updated.

6. The method of claim 1, wherein the mobile application client is configured to execute the script to enforce the custom rule without requiring changes to a build of the mobile application client.

7. The method of claim 1, wherein the defined characteristics of the user accounts describe both (i) the geographic location in which the custom rule applies to the transactions and (ii) the business role for which the custom rule applies to the duty or authority of the business role.

8. The method of claim 1, wherein the creating further comprises:
identifying an object of the mobile application client to which the custom rule is applied;
selecting an event for the object which will trigger enforcement of the custom rule; and
transmitting the selected event and an identifier for the object to the instance of the mobile application client to further enable the instance to enforce the custom rule when the instance is operating in the offline mode.

9. The method of claim 1, wherein the creating further comprises:
generating instructions to present a graphical user interface for creation of the custom rule;
transmitting the instructions to a client computing device associated with an administrator account to cause the graphical user interface to be displayed; and
accepting user inputs received through the graphical user interface to create the custom rule.

10. The method of claim 1, wherein a graphical user interface presented by the instance of the mobile application client displays results of the custom rule immediately following acceptance of an input that triggers the custom rule.

11. The method of claim 1, wherein the custom rule is a data validation rule to ensure that data entered by the user meets a requirement.

12. A computing system, comprising:
a processor;
a memory operably connected to the processor;
a non-transitory computer-readable medium operably connected to the processor and memory and storing computer-executable instructions that when executed by at least the processor cause the computing system to:
create on a mobile application server an interpreted programming language script that describes a custom rule for enforcement on a transaction performed on a mobile application client at a time the transaction is performed, wherein the mobile application client is configured to enforce the custom rule when operating in offline mode by executing the script with a script execution engine of the mobile application client;
define on the mobile application server defined characteristics of user accounts for which the mobile application client is to enforce the custom rule, wherein the defined characteristics describe at least one of (i) a geographic location for which the custom rule applies to transactions and (ii) a business role for which the custom rule applies to a duty or authority of the business role;
in response to a connection being established between an instance of the mobile application client for a specific user account and the mobile application server,
parse by the mobile application server a record describing characteristics of the specific user account to identify a characteristic of the specific user account, wherein the characteristic of the specific user account is one of a geographic location or business role assigned to a user, and
determine by the mobile application server that the instance of the mobile application client should enforce the custom rule based at least in part on a match between the characteristic of the specific user account and the defined characteristics; and
in response to determining that the instance of the mobile application client should enforce the custom rule, transmit the script from the mobile application server to the instance of the mobile application client to enable the instance to enforce the custom rule to validate data at the time of transaction performance when the instance of the mobile application client is operating in the offline mode.

13. The computing system of claim 12, wherein the non-transitory computer-readable medium further comprises instructions that when executed by at least the processor cause the computing system to:
place the instance of the mobile application client into the offline mode in response to a detection of a lack of network connectivity to the mobile application server; and
while the instance of the mobile application client is operating in the offline mode:
(i) accept a user input to the instance of the mobile application client that triggers enforcement of the custom rule, and
(ii) perform all functions of the custom rule locally by the instance of the mobile application client to immediately enforce the custom rule.

14. The computing system of claim 12, wherein the non-transitory computer-readable medium further comprises instructions that when executed by at least the processor cause the computing system to:
compose a query to retrieve server-side supporting data that is queried during enforcement of the custom rule from a server-side mobile application database;
execute the query on the server-side mobile application database to obtain the server-side supporting data; and
transmit the server-side supporting data to the instance of the mobile application client to further enable the instance to enforce the custom rule on a client side when the instance is operating in the offline mode.

15. The computing system of claim 14, wherein the non-transitory computer-readable medium further comprises instructions that when executed by at least the processor cause the computing system to:
  place the instance of the mobile application client into the offline mode in response to a detection of a lack of network connectivity to the mobile application server; and
  while the instance of the mobile application client is operating in the offline mode:
    (i) accept a user input to the instance of the mobile application client that triggers enforcement of the custom rule, and
    (ii) retrieve a portion of the supporting data from local storage to enable the instance of the mobile application client to immediately enforce the custom rule.

16. The computing system of claim 12, wherein the non-transitory computer-readable medium further comprises instructions that when executed by at least the processor cause the computing system to:
  add the custom rule to a database of rules associated with the mobile application server;
  increment a current version number of the database;
  in response to the establishment of the connection, compare the current version number of the database with a stored version number of the database stored by the mobile application client to determine that the current version number exceeds the stored version number; and
  compare the characteristics of the specific user account and the defined characteristics to find the match in response to the determination that the current version number exceeds the stored version number.

17. A non-transitory computer-readable medium storing computer-executable instructions that when executed by at least a processor of a computer cause the computer to:
  create on a mobile application server an interpreted programming language script that describes a custom rule for enforcement on a transaction performed on a mobile application client at a time the transaction is performed, wherein the mobile application client is configured to enforce the custom rule when operating in offline mode by executing the script with a script execution engine of the mobile application client;
  define on the mobile application server defined characteristics of user accounts for which the mobile application client is to enforce the custom rule, wherein the defined characteristics describe at least one of (i) a geographic location for which the custom rule applies to transactions and (ii) a business role for which the custom rule applies to a duty or authority of the business role;
  in response to a connection being established between an instance of the mobile application client for a specific user account and the mobile application server,
    parse by the mobile application server a record describing characteristics of the specific user account to identify a characteristic of the specific user account, wherein the characteristic of the specific user account is one of a geographic location or business role assigned to a user, and
    determine by the mobile application server that the instance of the mobile application client should enforce the custom rule based at least in part on a match between the characteristic of the specific user account and the defined characteristics; and
  in response to determining that the instance of the mobile application client should enforce the custom rule, transmit the script from the mobile application server to the instance of the mobile application client to enable the instance to enforce the custom rule to validate data at the time of transaction performance when the instance of the mobile application client is operating in the offline mode.

18. The non-transitory computer-readable medium of claim 17, further comprising instructions that when executed by at least the processor cause the computer to:
  compose a query to retrieve server-side supporting data that is queried during enforcement of the custom rule from a server-side mobile application database;
  execute the query on the server-side mobile application database to obtain the server-side supporting data; and
  transmit the server-side supporting data to the instance of the mobile application client to further enable the instance to enforce the custom rule on a client side when the instance is operating in the offline mode.

19. The non-transitory computer-readable medium of claim 17, further comprising instructions that when executed by at least the processor cause the computer to:
  add the custom rule to a database of rules associated with the mobile application server;
  increment a current version number of the database;
  in response to the establishment of the connection, compare the current version number of the database with a stored version number of the database stored by the mobile application client to determine that the current version number exceeds the stored version number; and
  compare the characteristics of the specific user account and the defined characteristics to find the match in response to the determination that the current version number exceeds the stored version number.

20. The non-transitory computer-readable medium of claim 17, further comprising instructions that when executed by at least the processor cause the computer to:
  identify an object of the mobile application client to which the custom rule is applied;
  select an event for the object which will trigger enforcement of the custom rule; and
  transmit the selected event and an identifier for the object to the instance of the mobile application client to further enable the instance to enforce the custom rule when the instance is operating in the offline mode.

* * * * *